United States Patent [19]
Haraguchi et al.

[11] Patent Number: 6,124,393
[45] Date of Patent: Sep. 26, 2000

[54] COMPOSITE OF THERMOSETTING RESIN WITH METALLIC OXIDE AND PROCESS FOR THE PREPARATION THEREOF

[75] Inventors: Kazutoshi Haraguchi; Yusho Usami, both of Chiba, Japan

[73] Assignee: Dainippon Ink and Chemicals, Inc., Tokyo, Japan

[21] Appl. No.: 09/051,000

[22] Filed: Mar. 31, 1998

Related U.S. Application Data

[62] Division of application No. 08/489,155, Jun. 9, 1995, Pat. No. 5,834,551.

Foreign Application Priority Data

| Jun. 10, 1994 | [JP] | Japan | 6-128777 |
| Sep. 19, 1994 | [JP] | Japan | 6-223177 |
| Sep. 27, 1994 | [JP] | Japan | 6-231193 |
| Jan. 23, 1995 | [JP] | Japan | 7-8100 |
| May 19, 1995 | [JP] | Japan | 7-121405 |

[51] Int. Cl.$^7$ .................. C08K 3/36; C08J 5/16
[52] U.S. Cl. .......... 524/492; 524/430; 524/493; 523/149; 523/209; 523/216
[58] Field of Search .................. 523/209, 216, 523/149; 524/859, 430, 492, 493

[56] References Cited

U.S. PATENT DOCUMENTS

| 4,115,959 | 9/1978 | McCormick | 51/295 |
| 4,190,686 | 2/1980 | Muis | 524/430 |
| 4,460,730 | 7/1984 | Koyama et al. | 524/430 |
| 4,798,758 | 1/1989 | Nagano et al. | 428/213 |
| 5,281,644 | 1/1994 | Iyer et al. | 524/430 |

FOREIGN PATENT DOCUMENTS 2182743  7/1990  Japan.

*Primary Examiner*—Tae Yoon
*Attorney, Agent, or Firm*—Armstrong, Westerman, Hattori, McLeland & Naughton

[57] ABSTRACT

A composite of a thermosetting resin with a metallic oxide, prepared by a process which comprises subjecting a metal alkoxide containing a silicon alkoxide and/or a low condensate thereof to hydrolysis and polycondensation in a solution of a phenolic resin and/or thermosetting resin containing a phenolic resin while effecting the removal of the solvents and/or curling reaction of the resins to incorporate a particulate metallic oxide having an average particle diameter of from 0.01 to 5 $\mu$m homogeneously in the thermosetting resin with a good interfacial wettability without causing macroscopic phase separation, as well as a process for the preparation of such a composite of a thermosetting resin with a metallic oxide and a process for the preparation of a crack-free molded composite product. A tribological material such as bearing, brake and clutch material includes such a composite as an essential constituent. The composite provides a thermosetting resin with an enhancement in surface properties such as hardness, sliding properties such as friction coefficient, critical PV value and wearability and mechanical properties such as impact resistance, particularly strength, elastic modulus and elongation. Thus, a cured or uncured composite of a thermosetting resin with a metallic oxide can be used as a molding material, sliding material, friction material, coating material, film-forming material, and the like.

19 Claims, 4 Drawing Sheets

COMPOSITE OF THERMOSETTING RESIN WITH METALLIC OXIDE AND PROCESS FOR THE PREPARATION THEREOF

This application is a division of application Ser. No. 08/489,155 filed Jun. 9, 1995, now U.S. Pat. No. 5,834,551.

FIELD OF THE INVENTION

The present invention relates to a composite of a thermosetting resin with a metallic oxide obtained by in-situ hydrolysis and polycondensation of metal alkoxides, a process for the preparation thereof, a molding process thereof, and a tribological material comprising such a composite. The composite of a thermosetting resin with a metallic oxide according to the present invention is excellent in surface properties such as transparency and hardness and mechanical properties, especially strength, elastic modulus, elongation, impact resistance and tribological properties such as friction and wear and is useful in the field of molding material, coating compound, film, etc.

BACKGROUND OF THE INVENTION

Because of its excellence in various properties such as heat resistance, durability, mechanical properties and surface properties like hardness, a thermosetting resin such as phenolic resin, epoxy resin and urea resin finds application in a wide range of fields such as electrical industry, electronic industry, automobile industry, construction industry and civil engineering as molding material, film-forming material, binder material, etc. With the enhancement of the requirements for these materials, extensive studies have been made to improve the properties of thermosetting resins by compounding.

In particular, compounding with an inorganic material as a reinforcement is one of the most widely practiced method for drastically enhancing various properties such as mechanical properties, heat resistance and electrical properties of a polymer. Examples of inorganic materials commonly used for compounding include fiber materials such as glass fiber and carbon fiber, and powdered materials such as calcium carbonate, silica, titania and magnesium oxide.

In practice, one or more of these inorganic materials are dispersed or mixed in a resin by melt blending method or solution blending method before use. In compounding, it is important to disperse or mix the inorganic materials thus added in the resin homogeneously as much as possible without causing ununiform agglomeration thereof to enhance the desired physical properties and hence obtain a composite material having a high performance.

On the other hand, it has been studied to use an inorganic material in a smaller form such as fine particle to accomplish further enhancement of physical properties. In general, however, the more fine particle the inorganic material is, the more difficultly can be made homogeneous mixing or dispersion thereof and the more strictly is restricted the enhancement of properties thereof.

Further, the more fine particle the inorganic material is, the higher is the price thereof. At present, it is the most usual that an inorganic reinforcement having a particle diameter of around 10 μm is used. An inorganic reinforcement having a particle size of from 1 to a few micrometers is used depending on the purpose. Some inorganic materials are used in a particulate form as small as not more than 1 μm.

It is thus thought that if inorganic materials having various sizes can be homogeneously and easily dispersed or mixed in a resin in a desired proportion, a new potential will be developed for a composite of an organic polymer with an inorganic material.

On the other hand, as a process for the preparation of a metallic oxide such as silica and titania there has been reported a method employing hydrolysis and polycondensation of a metal alkoxide, i.e., so-called sol-gel processing. In recent years, a method has been studied which comprises effecting sol-gel processing in an organic polymer solution to disperse the resulting metallic oxide in a polymer.

To date, as an organic polymer to be used as a matrix there have been mainly studied water-soluble polymers and some thermoplastic polymers. For example, water-soluble polymers such as polyethylene glycol, polyvinyl alcohol, polyvinyl pyrrolidone, polyoxazoline and sodium polystyrenesulfonate, polyoxytetramethylene, polyether ketone and (meth)acrylic polymer, modified hydroxyl-containing silicone resin such as polydimethylsiloxane terminated by a silanol group at both ends thereof, silicone elastomer, etc. have been studied to enhance the physical properties of various resins.

On the other hand, referring to thermosetting resins, a composite of a polyimide with silica obtained by compounding a polyamic acid as a polyimide precursor with a silicon alkoxide has been mainly studied (see "Journal of Material Chemistry", vol. 2, 679 (1992)). When its silica content is increased, the polyimide/silica composite obtained by using a polyamic acid becomes opaque, making it difficult to provide free control over the particle diameter of silica thus compounded. Further, when observed under a scanning electron microscope, most interfaces are observed without any adherence. Thus, despite its transparency, the composite exhibits an insufficient adhesivity at interfaces.

Moreover, the mechanical properties, except elastic modulus, of the composite thus obtained are greatly poorer than those of resin. This means that even a thermosetting resin/metallic oxide composite obtained by a process which comprises reacting a metal alkoxide in a polymer solution to produce a metallic oxide as well as render the matrix polymer heat-infusible cannot easily provide a high performance material having excellent mechanical properties. The use of a product of chemical modification of a polyamic acid, e.g., by the introduction of an ethoxysilyl group or the use of phenyltriethoxysilane as a starting material of metal alkoxide has been studied to enhance the mechanical properties of the polyimide/silica composite. However, these approaches can provide an enhancement of the elastic modulus of the composite at most but cannot attain a great enhancement of the strength and elongation of the composite as compared with the resin. Further, the method involving the chemical modification presents a cost problem and is hardly employed in practical use.

No reports have been made on studies of compounding with various thermosetting resins such as epoxy resin, phenolic resin and unsaturated polyester resin except for the use of shellac resin, which is a natural resin whose structure is indefinite (JP-A-5-65418 (The term "JP-A" as used herein means an "unexamined published Japanese patent application")), and the use of a ketone resin (JP-A-5-331353). No examples have been reported, including the foregoing examples, of great enhancement of mechanical properties such as strength, elongation and elastic modulus of the composite as compared with the resin.

SUMMARY OF THE INVENTION

It is therefore an object of the present invention to provide a composite of a thermosetting resin with a metallic oxide which exhibits an enhancement of various physical properties such as strength, elastic modulus and elongation in mechanical properties and hardness in surface properties of a thermosetting resin and is useful as a molding material, coating material, film-forming material or the like.

It is another object of the present invention to provide a process for the preparation of the foregoing composite.

It is a further object of the present invention to provide a process for the preparation of a molded product of such a composite free of crack.

These and other objects of the present invention will become more apparent from the following detailed description and examples.

The present inventors made extensive studies of a homogeneous composite of a thermosetting resin with a metallic oxide which exerts a high compounding effect. As a result, it was found that there are some important approaches. For example, it is important that a phenolic resin or a thermosetting resin containing a phenolic resin be used as a thermosetting resin. Further, it is important that a metallic oxide obtained by the hydrolysis and polycondensation of a metal alkoxide containing a silicon alkoxide and/or a low condensate thereof in a solution of the foregoing thermosetting resin be used as a metallic oxide. Further, it is important that the metallic oxide be microscopically and homogeneously dispersed in the resin without macroscopic phase separation. Further, it is important that the size of dispersed particles be well controlled. Still further, it is important that the metallic oxide thus dispersed have an interface at which it is strongly attached to the matrix resin. The preparation conditions were studied on the basis of these requirements. Thus, the present invention has been worked out. It was also found that a composite material comprising as an essential constituent a composite of a thermosetting resin with a metallic oxide obtained from a phenolic resin or thermosetting resin containing a phenolic resin and a metal alkoxide containing a silicon alkoxide and/or a low condensate thereof can provide a tribological material having excellent properties. Thus, the present invention has been worked out.

The present invention concerns a composite of a thermosetting resin with a metallic oxide, prepared by a process which comprises subjecting a metal alkoxide containing a silicon alkoxide and/or a low condensate thereof to hydrolysis and polycondensation in a solution of a phenolic resin and/or thermosetting resin containing a phenolic resin while effecting the removal of the solvents and/or curing reaction of the resins to incorporate a particulate metallic oxide having an average particle diameter of from 0.01 to 5 $\mu$m homogeneously in said thermosetting resin in an amount of from 1 to 35% by weight based on the weight of said composite without causing macroscopic phase separation.

The present invention also concerns a composite of a thermosetting resin with a metallic oxide, prepared by a process which comprises preparing a solution comprising a metal alkoxide, water and/or a solvent, and/or a catalyst, allowing said solution to undergo reaction for a period of time of not more than 90% of the gelation time thereof, preparing a homogeneous solution of the reaction product and a solution of a phenolic resin and/or thermosetting resin containing a phenolic resin, and then subjecting said metal alkoxide to further hydrolysis and polycondensation in said homogeneous solution while effecting the removal of the solvents and/or curing reaction of the resins to incorporate a particulate metallic oxide having an average particle diameter of from 0.01 to 5 $\mu$m homogeneously in said thermosetting resin in an amount of from 1 to 35% by weight based on the weight of said composite without causing macroscopic phase separation.

In the composite of a thermosetting resin with a metallic oxide according to the present invention, the phenolic resin and/or thermosetting resin containing a phenolic resin is soluble in a solvent compatible with the metal alkoxide. Alternatively, the phenolic resin and/or thermosetting resin containing a phenolic resin is soluble in an alcohol obtained by the hydrolysis of the metal alkoxide. In the composite of a thermosetting resin with a metallic oxide according to the present invention, the phenolic resin is a resol phenolic resin or high ortho phenolic resin. Further, the phenolic resin is a novolak phenolic resin capable of melt-molding without any organic solvent and soluble in an organic solvent.

In the composite of a thermosetting resin with a metallic oxide according to the present invention, the thermosetting resin is a phenolic resin and the metal alkoxide comprises a silicon alkoxide and/or a low condensate of a silicon alkoxide. The metal alkoxide can also comprise a monoalkyltrialkoxysilane and/or dialkyldialkoxysilane in an amount of from 1 to 40 parts by weight based on 100 parts by weight of tetraalkoxysilane and/or low condensate thereof.

In the composite of a thermosetting resin with a metallic oxide according to the present invention, the size of the particulate metallic oxide contained therein is 0.01 $\mu$m or more and less than 0.2 $\mu$m as calculated in terms of average particle diameter. Alternatively, the size of the particulate metallic oxide contained therein is from 0.2 to 5 $\mu$m as calculated in terms of average particle diameter.

Further, the composite of a thermosetting resin with a metallic oxide according to the present invention exhibits a light transmittance of not less than 50% and a transparency.

In the composite of a thermosetting resin with a metallic oxide according to the present invention, the flexural strength, flexural modulus and elongation at break thereof are all greater than those of the thermosetting resin alone. The ratio of the surface hardness of the composite of a thermosetting resin with a metallic oxide to that of the thermosetting resin alone is not less than 1.05.

The composite of a thermosetting resin with a metallic oxide according to the present invention further comprises a fiber and/or powder of an inorganic material such as metal and glass or a fiber and/or powder of an organic material such as cellulose and aramide incorporated therein. The present invention further concerns a composite, comprising a fiber or milled fiber or a fabric or nonwoven fabric based thereon, the surface of which being coated with the composite of a thermosetting resin with a metallic oxide according to the present invention in an amount of 0.5% by weight based on the weight thereof.

The present invention further concerns an uncured composite of a thermosetting resin with a metallic oxide, obtained by a process which comprises subjecting a metal alkoxide containing a silicon alkoxide and/or a low condensate thereof to hydrolysis and polycondensation in a solution of a phenolic resin and/or thermosetting resin containing a phenolic resin while removing the solvents until the apparent solvent content represented by the following equation (1) reaches 1 to 20% by weight:

Apparent solvent content (wt. %)={(weight of composite including solvent)−(weight of composite from which solvent has been completely removed)}/(weight of composite from which solvent has been completely removed)×100   (1)

The present invention further concerns an uncured composite of a thermosetting resin with a metallic oxide, obtained by a process which comprises subjecting a metal alkoxide containing a silicon alkoxide and/or a low condensate thereof to hydrolysis and polycondensation in a solution of a novolak phenolic resin capable of melt-molding without any organic solvent and soluble in an organic solvent, and then drying the polycondensation product at a temperature of not higher than the melt temperature of said novolak phenolic resin so that the organic solvent used is removed therefrom.

In the uncured composite according to the present invention, as the novolak phenolic resin there is used a novolak phenolic resin comprising a curing agent incorporated therein. The composite of a thermosetting resin with a metallic oxide according to the present invention further comprises a fiber and/or powder of an inorganic material such as metal and glass or a fiber and/or powder of an organic material such as cellulose and aramide incorporated therein.

The present invention also concerns a process for the preparation of a composite of a thermosetting resin with a metallic oxide, which comprises subjecting a metal alkoxide containing a silicon alkoxide and/or a low condensate thereof to hydrolysis and polycondensation in a solution of a phenolic resin and/or thermosetting resin containing a phenolic resin while effecting the removal of the solvent and/or curing reaction of the resins to incorporate a particulate metallic oxide homogeneously in said composite without causing macroscopic phase separation.

The process for the preparation of a composite of a thermosetting resin with a metallic oxide according to the present invention comprises the steps of:

(1) preparing a resin solution comprising a phenolic resin and/or thermosetting resin containing a phenolic resin dissolved in a solvent miscible with both said metal alkoxide and water;

(2) adding a metal alkoxide containing a silicon alkoxide and/or a low condensate thereof, a solvent miscible with both said metal alkoxide and water, and optionally water and/or catalyst to said resin solution to form a homogeneous solution without causing phase separation of the mixed solution; and (3) simultaneously effecting the hydrolysis and polycondensation of said metal alkoxide and the removal of the solvent and curing reaction of the resins prior to the gelation of the mixed solution to obtain a homogeneous composite of a thermosetting resin with a metallic oxide without causing macroscopic phase separation.

The present invention further concerns a process for the preparation of a composite of a thermosetting resin with a metallic oxide, which comprises preparing a solution comprising a metal alkoxide and water and/or catalyst, allowing said solution to undergo reaction for a period of time of not more than 90% of the gelation time thereof, preparing a homogeneous solution of the reaction product and a solution of a phenolic resin and/or thermosetting resin containing a phenolic resin, and then subjecting said metal alkoxide to further hydrolysis and polycondensation in said homogeneous solution while effecting the removal of the solvents and/or curing reaction of the resins to incorporate a particulate metallic oxide homogeneously in said thermosetting resin without causing macroscopic phase separation.

The process for the preparation of a composite of a thermosetting resin with a metallic oxide according to the present invention comprises the steps of:

(1) preparing a resin solution comprising a phenolic resin and/or thermosetting resin containing a phenolic resin dissolved in a solvent miscible with both said metal alkoxide and water;

(2) preparing a solution comprising a metal alkoxide containing a silicon alkoxide and/or a low condensate thereof, a solvent miscible with both said metal alkoxide and water, and water, and optionally a catalyst, and allowing said solution to undergo reaction for a period of time of not more than 90% of the gelation time thereof to prepare a metal alkoxide solution;

(3) mixing said resin solution, said metal alkoxide solution, optionally a solvent miscible with both said two solutions, and optionally water and/or catalyst to form a homogeneous solution without causing phase separation thereof; and (4) simultaneously effecting the hydrolysis and polycondensation of said metal alkoxide and the removal of the solvent and curing reaction of the resins prior to the gelation of the mixed solution to obtain a homogeneous composite of a thermosetting resin with a metallic oxide without causing macroscopic phase separation.

In the process for the preparation of a composite of a thermosetting resin with a metallic oxide according to the present invention, the size of the particulate metallic oxide incorporated in the composite of a thermosetting resin with a metallic oxide is from 0.01 to 5 $\mu$m as calculated in terms of average particle diameter. In the process for the preparation of a composite of a thermosetting resin with a metallic oxide according to the present invention, the content of metallic oxide in said composite of a thermosetting resin with a metallic oxide is from 1 to 35% by weight. The amount of water to be used is from 0.5 to 12 mol per mol of the metal alkoxide used and the amount of solvent to be used is high enough to be miscible the metal alkoxide and water therein. In the process for the preparation of a composite of a thermosetting resin with a metallic oxide according to the present invention, the hydrolysis and polycondensation of the metal alkoxide is effected with water content in the air with which the metal akoxide is brought into contact during solvent casting without incorporating water in the solution containing a thermosetting resin and a metal alkoxide.

In the process for the preparation of a composite of a thermosetting resin with a metallic oxide according to the present invention, the catalyst is an organic acid or inorganic acid and its amount is from 0 to 0.3 mol per mol of the metal alkoxide used. The phenolic resin and/or thermosetting resin containing a phenolic resin is soluble in a solvent compatible with the metal alkoxide. Further, the phenolic resin and/or thermosetting resin containing a phenolic resin is soluble in an alcohol obtained by the hydrolysis of the metal alkoxide. The phenolic resin is a resol phenolic resin or high ortho phenolic resin. The metal alkoxide is a silicon alkoxide or low condensate thereof. The metal alkoxide can also comprise a monoalkyltrialkoxysilane or dialkyldialkoxysilane in an amount of from 1 to 40 parts by weight based on 100 parts by weight of tetraalkoxysilane and/or low condensate thereof.

The present invention also concerns a process for the preparation of an uncured composite of a thermosetting resin with a metallic oxide, which comprises subjecting a metal alkoxide containing a silicon alkoxide and/or a low condensate thereof to hydrolysis and polycondensation in a solution of a phenolic resin and/or thermosetting resin containing a phenolic resin while removing the solvents until the apparent solvent content represented by the following equation (1) reaches 1 to 20% by weight:

Apparent solvent content (wt.%)={(weight of composite including solvent)−(weight of composite from which solvent has been completely removed)}/(weight of composite from which solvent has been completely removed)×100     (1)

The present invention further concerns a process for the preparation of an uncured composite of a thermosetting resin with a metallic oxide, which comprises subjecting a metal alkoxide containing a silicon alkoxide and/or a low condensate thereof to hydrolysis and polycondensation in a solution of a novolak phenolic resin capable of melt-molding without any organic solvent and soluble in an organic solvent while drying the polycondensation product at a temperature of not higher than the melt temperature of said novolak phenolic resin so that the organic solvent used is removed therefrom.

In the process for the preparation of an uncured composite of a thermosetting resin with a metallic oxide according to the present invention, the novolak phenolic resin or solution thereof has previously comprised a curing agent incorporated therein.

The present invention also concerns a process for the preparation of an uncured composite of a thermosetting resin with a metallic oxide, which comprises subjecting a metal alkoxide containing a silicon alkoxide and/or a low condensate thereof to hydrolysis and polycondensation in a solution of a phenolic resin and/or thermosetting resin containing a phenolic resin while removing the solvents until the apparent solvent content represented by the following equation (1) reaches 1 to 20% by weight to prepare an uncured composite of a thermosetting resin with a metallic oxide containing a solvent, and then thermoforming said uncured composite at a higher temperature or higher temperature and pressure than those used for the removal of the solvents:

Apparent solvent content (wt. %)={(weight of composite including solvent)−(weight of composite from which solvent has been completely removed)}/(weight of composite from which solvent has been completely removed)×100     (1)

The present invention also concerns a process for the preparation of a molded product of a composite of a thermosetting resin with a metallic oxide, which comprises grinding or molding an uncured composite of a thermosetting resin with a metallic oxide having an apparent solvent content of from 1 to 20% by weight according to the present invention in the form of pellet, powder or block, and then thermoforming the molded product at a higher temperature or higher temperature and pressure than those used for the removal of the solvents.

The present invention further comprises a process for the preparation of a molded product of a composite of a thermosetting resin with a metallic oxide, which comprises grinding an uncured composite of a novolak phenolic resin with a metallic oxide according to the present invention in the form of powder, and then thermoforming the uncured composite thus ground as it is or with a curing agent added thereto at a temperature of not lower than the melt temperature of said novolak phenolic resin.

The present invention also concerns a tribological material, comprising a composite of a thermosetting resin with a metallic oxide according to the present invention as an essential constituent.

The tribological material according to the present invention further comprises one or more additives selected from the group consisting of organic material such as polytetrafluoroethylene, aramide fiber, cellulose and rubber, carbon material such as carbon fiber and graphite, inorganic material such as asbestos and alumina and metallic material such as steel fiber.

BRIEF DESCRIPTION OF THE DRAWINGS

By way of example and to make the description more clear, reference is made to the accompanying drawings in which.

DETAILED DESCRIPTION OF THE INVENTION

Figure 1:
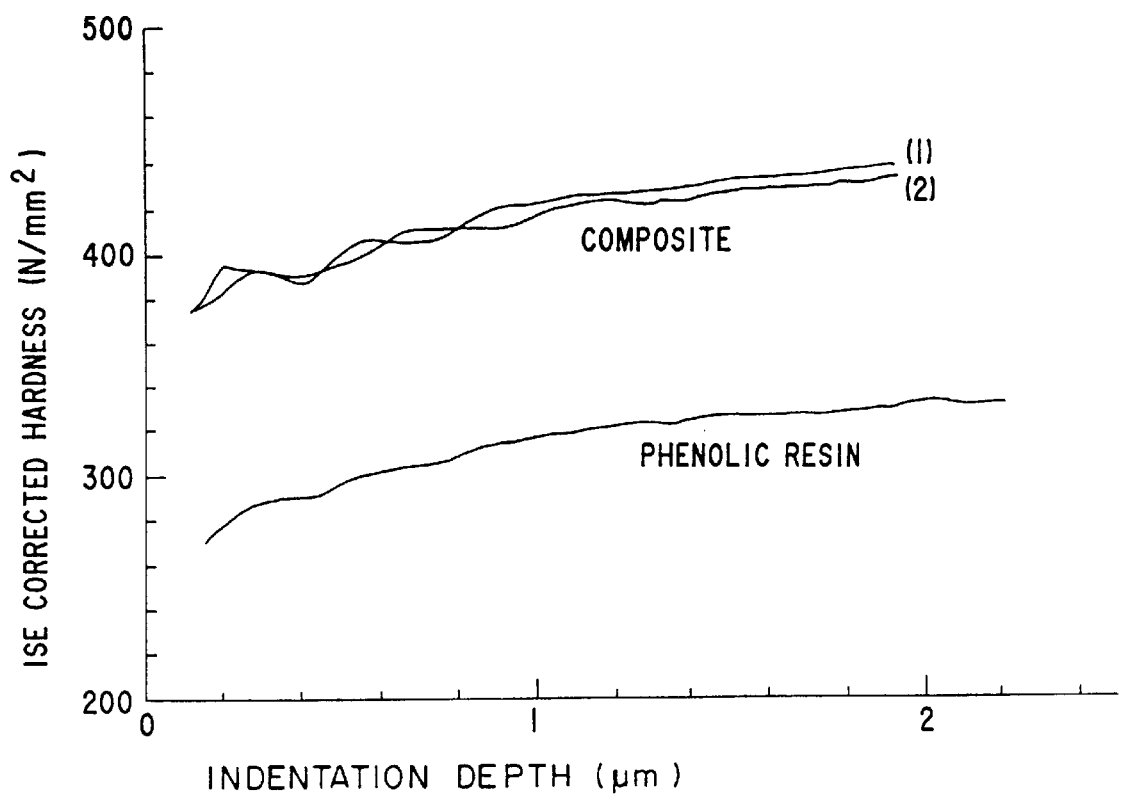
FIG. 1 is a graph illustrating the results of measurement of the dynamic hardness of a composite of a thermosetting resin with a metallic oxide obtained in Example 1 and a phenolic resin as a starting material, wherein the ordinate indicates the dynamic hardness [N/mm$^2$] and the abscissa indicates the indentation depth [$\mu$m], the results (1) and (2) of the composite indicating measurements at different positions thereof.

The present invention relates to a composite of a thermosetting resin with a metallic oxide comprising a phenolic resin or thermosetting resin containing a phenolic resin and a metallic oxide such as silica obtained from a silicon alkoxide or metal alkoxide containing a silicon alkoxide and more particularly to a phenolic resin/silica composite. The present invention also relates to a tribological material comprising such a composite of a thermosetting resin with a metallic oxide as an essential constituent.

As the thermosetting resin to be incorporated in the composite of the present invention there may be used a cured thermosetting resin or a thermosetting resin which has been left insufficiently cured. In general, the cured thermosetting resin is used in end use. The thermosetting resin which has been left insufficiently cured is used as a molding material.

The term "uncured composite" as used herein is meant to indicate a composite in the form of uncured resin.

The composite of a thermosetting resin with a metallic oxide of the present invention is obtained by a process which comprises subjecting a silicon alkoxide or metal alkoxide containing a silicon alkoxide to hydrolysis and polycondensation reaction in a solution of a phenolic resin or thermosetting resin containing a phenolic resin while effecting the removal of the solvents and/or curing reaction of the resin. Eventually, a particulate metallic oxide such as silica having a controlled size ranging from 0.01 to 5 $\mu$m can be homogeneously compounded with the thermosetting phenolic resin. In accordance with the foregoing preparation process, the adhesivity at the interface of the metallic oxide with the resin can be well controlled.

For example, the phenolic resin/silica composite obtained according to the present invention remains homogeneous and exhibits a controlled transparency and an excellent interfacial bond in a wide range of silica content. The phenolic resin/silica composite of the present invention also exhibits a sufficient surface hardness and excellent in mechanical properties such as flexural modulus, flexural strength, elongation at break and impact resistance and heat resistance, etc. The phenolic resin/silica composite obtained according to the present invention exhibits a low friction coefficient, a low wearability and a high critical PV value and thus can be used as an excellent sliding material as it is, not to mention in admixture with various frictional resistance reducers or physical property improvers.

As the source of particulate silica there has been heretofore known aerogel as dried particulate silica source or organosilicasol as silica source dispersed in liquid. However, since these silica sources have an insufficient dispersibility or a low interfacial wettability by resins, the resulting composite exhibits a reduced transparency or reduced mechanical properties as compared with the composite with a silica produced in-situ according to the present invention.

Referring to the thermosetting resin of the present invention, if a phenolic resin is used, it forms a homogeneous composite having excellent physical properties with a silica obtained by the hydrolysis and polycondensation of a silicon alkoxide in a solution of the phenolic resin. For example, if an epoxy resin, which is one of other typical thermosetting resins, is used, macroscopic phase separation can easily occur during the preparation of the composite or the particle diameter or interface cannot be controlled, making it difficult to obtain a homogeneous composite of a thermosetting resin with a metallic oxide excellent in mechanical properties according to the present invention.

As the phenolic resin employable in the present invention there may be used a phenolic resin soluble in a solvent miscible with both the metal alkoxide used and water. In particular, a phenolic resin soluble in an alcohol obtained by the hydrolysis of the metal alkoxide used can be preferably used to control the particle diameter of the particulate metallic oxide of the present invention or for other purposes.

The term "solvent miscible with both metal alkoxide and water" as used herein is meant to indicate a solvent which can be mixed with both a metal alkoxide and water to form a uniform system insusceptible to phase separation. As such a solvent there may be used an alcohol such as benzyl alcohol. In particular, an alcohol such as methanol and ethanol obtained by the hydrolysis of the metal alkoxide used may be preferably used. Other examples of solvents employable in the present invention include NMP, THF, DMAc, DMF, MEK and m-cresol.

A phenolic resin insoluble in such a solvent can hardly form a homogeneous composite with a metal alkoxide such as the silicon alkoxide according to the present invention. However, the phenolic resin insoluble in such a solvent can be used in admixture with a composite of a thermosetting resin with a metallic oxide obtained according to the present invention or precursor thereof which has been left insufficiently cured. Particularly preferred among these solvent-soluble phenolic resins is a resol phenolic resin. A novolak phenolic resin can be less easily prepared and can less easily control the particle diameter of silica.

A high ortho phenolic resin synthesized in a middle pH range (e.g., pH 4 to 7) in the presence of a mild acid catalyst such as acetate of divalent metal (e.g., Ca, Mg, Zn), resol type or novolak type, can produce an excellent composite comprising a particulate metallic oxide homogeneously dispersed therein.

In general, a novolak resin which is melt-molding without any organic solvent and is solvent-soluble can be compounded with a metal alkoxide in a solution, and then dried at a temperature of not higher than the melt temperature of the novolak resin in vacuo or in a stream of gas so that the organic solvent used is removed to obtain a composite having excellent mechanical properties. However, such a novolak resin is often unfavorable for the control over transparency, etc.

Besides such a single phenolic resin, a thermosetting resin mixture comprising such a phenolic resin homogeneously incorporated therein can be used. As the thermosetting resin in which the phenolic resin is incorporated there may be used any thermosetting resin which can be dissolved in the solvent for the phenolic resin used to form a homogeneous mixed resin solution or which can be homogeneously compounded with the phenolic resin during heat fusion. Thus, the thermosetting resin is not specifically limited.

As the metallic oxide employable in the present invention there may be used a silicon alkoxide (tetraalkoxysilane) represented by $Si(OR)_4$ (in which R represents a $C_{1-4}$ alkyl group) such as tetramethylorthosilicate (also referred to as "tetramethoxysilane"), tetraethylorthosilicate (also referred to as "tetraethoxysilane) and tetrapropylorthosilicate (also referred to as "tetrapropoxysilane") and/or low condensate thereof. For example, a silica obtained by the hydrolysis and polycondensation of a low condensate of a dimer or higher oligomer up to decamer of the silicon alkoxide is preferred.

As the metal alkoxide there can be advantageously used a compound comprising from 1 to 40 parts by weight, preferably from 3 to 30 parts by weight of a monoalkyltrialkoxysilane such as monomethyltrimethoxysilane, monomethyltriethoxysilane, monoethyltrimethoxysilane, monoethyltriethoxysilane and monophenyltrimethoxysilane or dialkyldialkoxysilane such as dimethyldimethoxysilane, dimethyldiethoxysilane, diethyldimethoxysilane and diethyldiethoxysilane in 100 parts by weight of the foregoing tetraalkoxysilane and/or low condensate thereof to obtain a composite of a thermosetting resin with a metallic oxide having excellent physical properties.

An alkoxide of a metal different from silicon such as titanium alkoxide, aluminum alkoxide and zirconium alkoxide can less easily produce a homogeneous composite in finely-dispersed form than silicon alkoxide irrespective of the kind of alkoxide.

However, as the metal alkoxide there can be used the foregoing silicon alkoxide in combination with other metal alkoxides so far as a homogeneous reaction proceeds.

The optimum metallic oxide content in the composite of a thermosetting resin with a metallic oxide of the present invention varies with the desired usage and the molding method but is normally from 1 to 35% by weight, preferably from 1 to 20% by weight, particularly from 2 to 15% by weight. If the metallic oxide content exceeds 35% by weight, cracking can occur under some molding conditions, making it difficult to obtain a homogeneous excellent resin composite. On the contrary, if the metallic oxide content falls below 1% by weight, the desired compounding effect cannot be exerted.

The size of the particulate metallic oxide incorporated in the composite of a thermosetting resin with a metallic oxide of the present invention is preferably from 0.01 to 5 $\mu$m as calculated in terms of average particle diameter. The definition that the lower limit of the average particle diameter of the particulate metallic oxide is 0.01 $\mu$m doesn't mean that the composite of a thermosetting resin with a metallic oxide of the present invention comprises no particulate metallic oxide having a particle diameter of less than 0.01 $\mu$m.

The foregoing definition of the average particle diameter of the particulate metallic oxide of the present invention to 0.01 to 5 μm is based on the measurements made by scanning electron microscope (SEM). The particle diameter falling below 0.01 μm can hardly be determined by scanning electron microscope (SEM) and thus can hardly be expressed numerically. Accordingly, a composite comprising a particulate metallic oxide having a particle diameter of from 0.01 to 0.001 μm incorporated therein can be included in the present invention.

If the size of the particulate metallic oxide incorporated in the composite is controlled to from 0.2 μm to 5 μm as calculated in terms of average particle diameter, a homogeneous opaque or semitransparent composite can be obtained. On the other hand, if the size of the particulate metallic oxide incorporated in the composite is controlled to from 0.01 to less than 0.2 μm as calculated in terms of average particle diameter, a homogeneous semitransparent or transparent composite can be obtained.

The transmittance of visible light by the composite of a thermosetting resin with a metallic oxide of the present invention is normally not less than 50%, preferably not less than 70%. A composite having a transmittance of not less than 90% can be prepared. Such a composite is particularly useful as a transparent composite.

In order to obtain a homogeneous composite of a thermosetting resin with a metallic oxide of the present invention, an uncured phenolic resin and/or uncured thermosetting resin containing a phenolic resin is dissolved in a solvent miscible with both a metal alkoxide and water to obtain a solution. To the solution are then added a metal alkoxide, the foregoing solvent miscible with both a metal alkoxide and water, optionally water, and optionally a catalyst or a catalyst solution so that a homogeneous solution can be produced without causing phase separation of the mixture.

The homogeneous solution is then subjected to work such as coating and injection before gelation. The material thus worked is then subjected to curing reaction of resin along with the removal of solvent by aeration, heating, evacuation or the like. Eventually, a homogeneous composite of a thermosetting resin with a metallic oxide can be prepared without causing macroscopic phase separation.

A composite of a thermosetting resin with a metallic oxide having better mechanical properties than that obtained with no reaction time can be prepared in the same manner as above except that as the metal alkoxide there is used a compound obtained by the reaction of a solution of a metal alkoxide and water, and/or solvent, and/or catalyst for a period of time of not more than 90%, preferably from 5 to 60%, particularly from 5 to 30% of the gelation time thereof.

As the foregoing reaction time is prolonged, the mechanical properties, particularly strength and/or elongation, of the composite reach maximum and then show a drop. If the reaction time exceeds 90% of the gelation time, a homogeneous composite having excellent physical properties cannot be obtained.

The amount of water to be used in the present invention is preferably from 0.5 to 12 mol, more preferably from 0.5 to 6 mol per mol of the metal alkoxide used. The water can be directly added to the system. Alternatively, the initial added amount of water may be none. Instead, water may be eventually taken into the system by absorbing water content from the atmosphere with which the system is brought into contact during casting or other procedures.

If the amount of water falls below 0.5 mol, the progress of the hydrolysis reaction is too slow. On the contrary, if the amount of water exceeds 12 mol, the progress of the hydrolysis is too fast or the polycondensation reaction becomes more three-dimensional, making it difficult to obtain a homogeneous composite or providing a reduced interfacial adhesivity.

Preferred examples of the catalyst employable in the present invention include acid catalyst such as organic acid (e.g., acetic acid, hydrochloric acid) and inorganic acid. The amount of the catalyst to be used is from 0 to 0.3 mol, preferably from 0 to 0.15 mol per mol of the metal alkoxide used. As expressed by this molar ratio, the addition of a catalyst is not necessarily essential herein. Thus, a system free of catalyst can be included in the present invention.

However, if an alkali such as ammonia and sodium hydroxide is incorporated in the system of the present invention as a catalyst, an excellent composite can hardly be obtained. In particular, the addition of such an alkaline catalyst shortens the gelation time or produces a reduced interfacial adhesivity.

In the present invention, if an alkali is added to the system, it causes an extreme reduction in the gelation, giving difficultly in handling of the mixture, though depending on the amount of water present in the system. If no catalyst is added to the system, gelation is completed in from several scores of minutes to several scores of hours, though depending on the content of silica or water used or the amount of the solvent used. Further, if an acid catalyst is added to the system, it is made possible to control the gelation time to several times-to several scores of times the foregoing gelatin time.

The composite of a thermosetting resin with a metallic oxide obtained according to the present invention is excellent in mechanical properties such as strength, elastic modulus and impact resistance and surface properties such as hardness and heat resistance, and adhesivity to glass or the like as well as in homogeneity and transparency controllability. Further, the composite obtained according to the present invention exhibits excellent tribological properties, i.e., low friction, low wearability, high critical PV and excellent heat stability thereof.

The enhancement of the properties of an organic resin with an inorganic material which has been heretofore widely practiced can provide an enhancement of only one or at most two of mechanical properties such as strength, elastic modulus and elongation. Ideally speaking, the three properties should be simultaneously enhanced. However, it has been considered very difficult to realize the simultaneous enhancement of these three properties.

In accordance with the present invention, as compared with the conventional inorganic material (fiber, powder)/resin mixture system, the particle diameter of the particulate metallic oxide thus dispersed in the resin can be controlled to from a very small value (about 10 nm) to a value as very great as order of μm. Further, the particulate metallic oxide can be homogeneously dispersed in the resin to provide a good bond at the interface with the resin. Accordingly, a composite excellent in homogeneity, transparency, surface properties such as hardness and mechanical properties can be provided.

In particular, the present invention exerts an effect of simultaneously improving the strength, elastic modulus and elongation of the resin as a starting material as desired. Further, the transparency of a composite comprising a silica in an amount of 1 to 35% by weight can be controlled to a value as high as about 98% of that of a composite obtained from a resin alone.

The composite of a thermosetting resin with a metallic oxide of the present invention can be prepared in the form of system further comprising a fiber and/or powder of an inorganic material such as other metals and glass and/or an organic material such as cellulose and aramide. The composite thus obtained can provide an excellent composite material.

Even such a composite of a thermosetting resin with a metallic oxide having excellent properties is disadvantageous in that it is subject to cracking due to shrinkage during solvent casting. This is thought because the thermosetting resin and the metal alkoxide are both thermosetting and have different heat shrinkabilities and the resulting composite is subject to cracking due to shrinkage and concomitant internal stress. In particular, the more the thickness of the sample is, or the more the metallic oxide content is, the more frequently occurs cracking.

Figure 4:
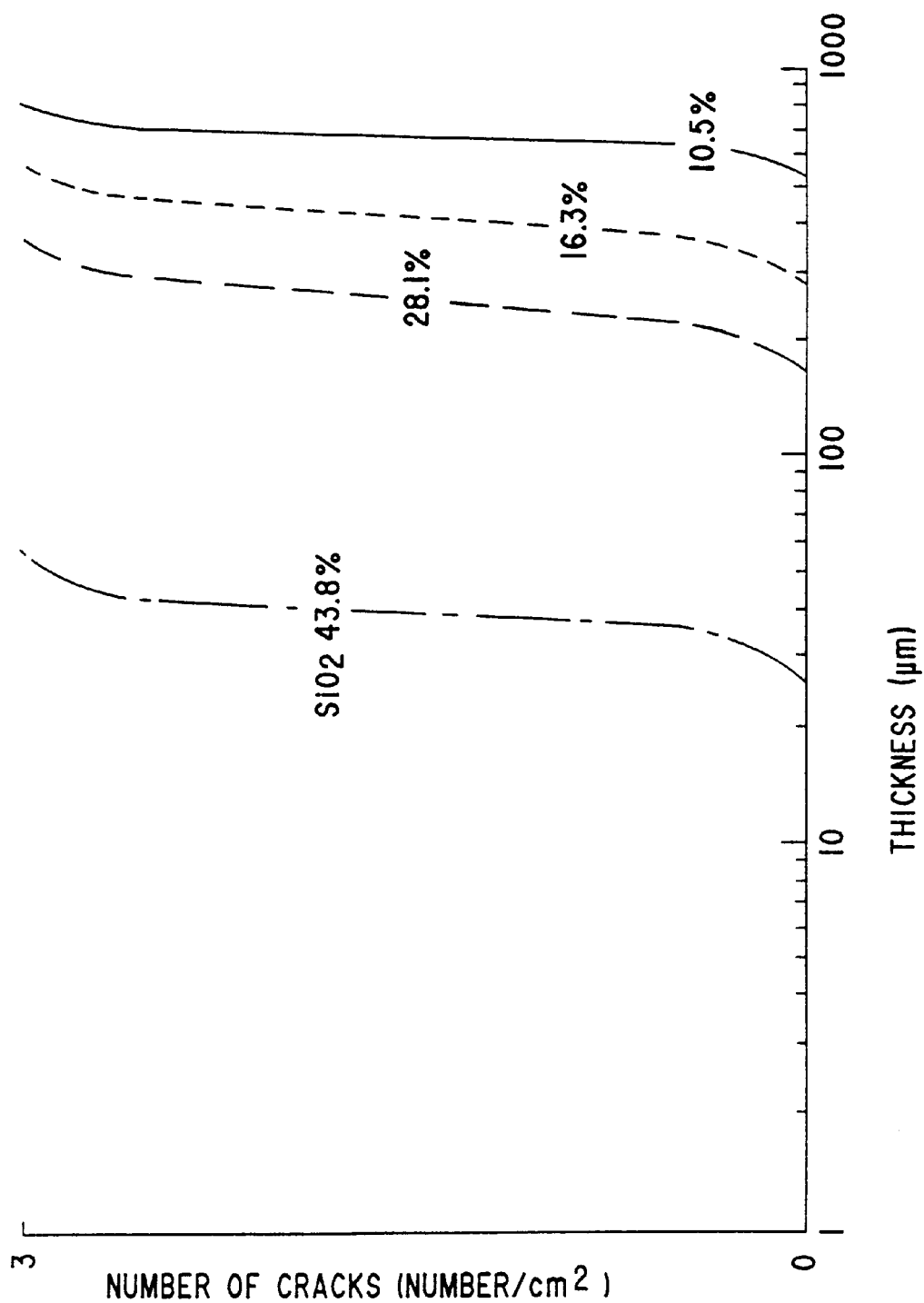
FIG. 4 is a graph illustrating an example of the relationship between the thickness and the crack content of a composite of a thermosetting resin with a metallic oxide prepared by solvent casting method, wherein the figure (%) indicates the content of SiO$_2$.

FIG. 4 shows an example of the relationship between the thickness and the crack content of the composite of a thermosetting resin with a metallic oxide prepared by solvent casting method. The occurrence of cracking greatly depends on the thickness and silica content of the composite. The more the thickness of the composite is, or the higher the silica content of the composite composition is, the more frequently occurs cracking. Therefore, the preparation method described later is preferably employed to prepare a crack-free molded product.

In the present invention, the uncured composite of a thermosetting resin with a metallic oxide to be used in the preparation of a thick molded product preferably comprises a solvent in an apparent content of from 1 to 20% by weight, more preferably from 2 to 15% by weight as determined by the following equation (1):

Apparent solvent content (wt. %)={(weight of composite including solvent)−(weight of composite from which solvent has been completely removed)}/(weight of composite from which solvent has been completely removed)×100   (1)

The reason why the term "apparent solvent content" is used herein is that the components which are released from the system during thermoforming or subsequent heat treatment don't necessarily include the solvent alone but also include low molecular compounds released by the condensation of uncured moiety of the resin and metal alkoxide. Thus, the term "apparent solvent content" as used herein is meant to indicate the amount of all the components released, i.e., proper required solvent content of the uncured composite of a thermosetting resin with a metallic oxide.

In some detail, if the apparent solvent content falls below 1% by weight, it is made impossible to attain sufficient integration by thermoforming, and the final molded product exhibits a reduced mechanical strength. On the contrary, if the apparent solvent content exceeds 20% by weight, it is made difficult to inhibit foaming caused by the release of the solvent during thermoforming, occasionally resulting in the production of an inhomogeneous composite having poor mechanical properties.

In the present invention, the uncured composite having an apparent solvent content of from 1 to 20% by weight is then normally ground or molded into pellet, powder, block or the like. However, the casted material may be stamped by a hot press as it is without undergoing such a form change, followed by the subsequent thermoforming.

The grinding or molding of the uncured composite containing a solvent into pellet may be effected with an uncured composite containing a proper solvent free from desolvating or effected in a step with a higher solvent content to eventually prepare an uncured composite having a proper range of solvent content.

The thermoforming of the uncured composite containing a proper solvent in an apparent content of from 1 to 20% by weight into a final molded product can be accomplished by an ordinary method such as hot press formation, injection molding and extrusion. However, the molding method is not specifically limited. However, the thermoforming needs to be effected at a higher temperature and/or higher pressure than used at the previous desolvation step.

If the thermoforming is effected at a lower temperature or pressure than used at the previous desolvation step, crack-free homogeneous excellent compounding cannot be attained. In the present invention, however, an uncured composite prepared from a novolak resin which is melt-molding without any organic solvent and is solvent-soluble and a metallic oxide can provide a molded product having excellent mechanical properties by melt-press molding method or the like even if the apparent solvent content of the uncured composite in the form of powder or block is not more than 1% by weight. The composite thus obtained comprises a microfine particulate metallic oxide homogeneously dispersed in the thermosetting resin. Thus, even if the composite is in a thick form, it is insusceptible to cracking or the like. Further, even when the composite is in a complicated form, it is less subject to deformation.- The composite thus obtained is excellent in mechanical properties such as strength, elastic modulus and impact resistance and surface properties such as hardness and heat resistance and adhesivity to glass or the like as well as in homogeneity and transparency controllability.

The composite of a thermosetting resin with a metallic oxide of the present invention can be prepared in the form of system comprising other known commonly used additives, e.g., inorganic material such as ceramic and glass and/or organic material such as rubber, cellulose and aramide, incorporated therein in the form of fiber or powder. Such a composite can provide an excellent composite material. In some detail, the composite of a thermosetting resin with a metallic oxide of the present invention can be thermoformed with an inorganic material such as alumina, calcium carbonate, glass and asbestos, and/or carbon material such as carbon fiber and graphite, and/or metallic material such as steel fiber, and/or thermoplastic resin such as aramide fiber, cellulose and polytetrafluoroethylene or fiber or powder of organic material such as rubber, and/or other various friction reducers, anti-slip agents or friction adjustors incorporated therein. These additives are used singly or in combination depending on the purpose. The addition of these additives may be effected either or both before the preparation of the uncured composite containing a proper solvent or during the final molding of the uncured composite containing a proper solvent.

The composite of a thermosetting resin with a metallic oxide obtained according to the present invention can provide a high performance composite material having excellent mechanical properties, surface properties and heat resistance which can be used in the form of molding material or film-forming material. Further, since the composite of a thermosetting resin with a metallic oxide of the present invention exhibits an excellent adhesivity at the interface with glass fiber or the like, it can be used as a surface sizing agent or prepreg agent for coating the surface of glass fiber, glass powder, aramide fiber, pulp, fabric based on these fibers or pulp, nonfabric, etc. in an amount of not less than 0.5% by weight or as a high performance tribological material having a low friction coefficient, a low wearability and a high critical PV value. Further, the composite of a thermosetting resin with a metallic oxide of the present invention can be mixed with various anti-slip materials and/or various friction adjustors to provide a high performance sliding material which exhibits a stabilized high friction coefficient under broad conditions.

Such a tribological material comprising a composite of a thermosetting resin with a metallic oxide as an essential constituent not only exhibits a controlled friction coefficient and excellent sliding properties such as low wearability and high critical pV value but also is excellent in mechanical properties such as strength and elastic modulus and surface properties such as hardness and heat resistance, homogeneity and stability in use. In some detail, the conventional sliding material reinforced with carbon fiber exhibits different sliding properties on different sliding surfaces with different fiber dispersion or orientation and thus cannot provide stable tribological properties. If the composite of a thermosetting resin with a metallic oxide of the present invention is used singly as a tribological material, it can provide a stable tribological material excellent in homogeneity and free of directional anisotropy in physical properties.

The present invention will be further described in the following examples, but the present invention should not be construed as being limited thereto. The term "%" as used hereinafter is by weight unless otherwise specified.

EXAMPLE 1

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) was sequentially added dropwise a homogeneous solution comprising 25 parts by weight of tetramethylorthosilicate (available from Tokyo Kasei Kogyo K.K.), 45 parts by weight of methanol and 14 parts by weight of water with stirring to prepare a homogeneous liquid mixture.

The liquid mixture thus obtained was then allowed to stand at a temperature of 30° C. in an airtight vessel for 1 hour. The liquid mixture was then applied to a clean glass plate. The liquid mixture was slowly solvent-casted at a temperature of 25° C. for about 5 hours so that the solvent was removed. Thereafter, the material was heated at a rate of 2° C. per minute to a temperature of 170° C. where it was then allowed to stand for 30 minutes.

The heat curing reaction of the phenolic resin and the polycondensation reaction of the metal alkoxide were simultaneously effected between casting and heating. The film thus obtained exhibited a silica content (silica/(silica +resin)) of 14.5% by weight.

The film thus obtained was homogeneous and transparent (light transmittance: 97%). The light transmittance herein is determined by the ratio of converted transmitted light to incident light ($(I^A/I) \times 100$) with respect to 800 nm light wherein $I^A$ is exp $\{\ln I/(d/100)\}$ (in which d is the thickness of the film ($\mu$m)).

On the other hand, the size of the dispersed silica particles was about 50 nm as determined by SEM ($\times 50,000$). Since the dispersed silica particles were small, their adhesivity to the matrix resin was indefinite. However, no peeling was observed at the interface with the resin, showing a good adhesivity between the silica particles and the matrix resin.

The film was subjected to three-point bending test (shape of sample: 5.0 mm wide×30 mm long×0.35 mm thick; span distance: 15 mm) to determine its mechanical properties. As a result, the film showed an elastic modulus (flexural modulus) of 745 kgf/mm$^2$, a flexural strength of 24.2 kgf/mm$^2$ and an elongation at break of 3.95%. All these values exceeded those of the thermosetting resin as a starting material (elastic modulus: 545 kgf/mm$^2$; strength: 17.0 kgf/mm$^2$; elongation: 3.0%).

The surface hardness of the film was measured by means of a Fisher scope H100V available from Fisher Co., Ltd. at an indentation depth of from 0.2 to 3 $\mu$m. The result was as high as about 420 N/mm$^2$ as shown in FIG. 1 (value of the resin alone: 310 N/mm$^2$).

Figure 2:
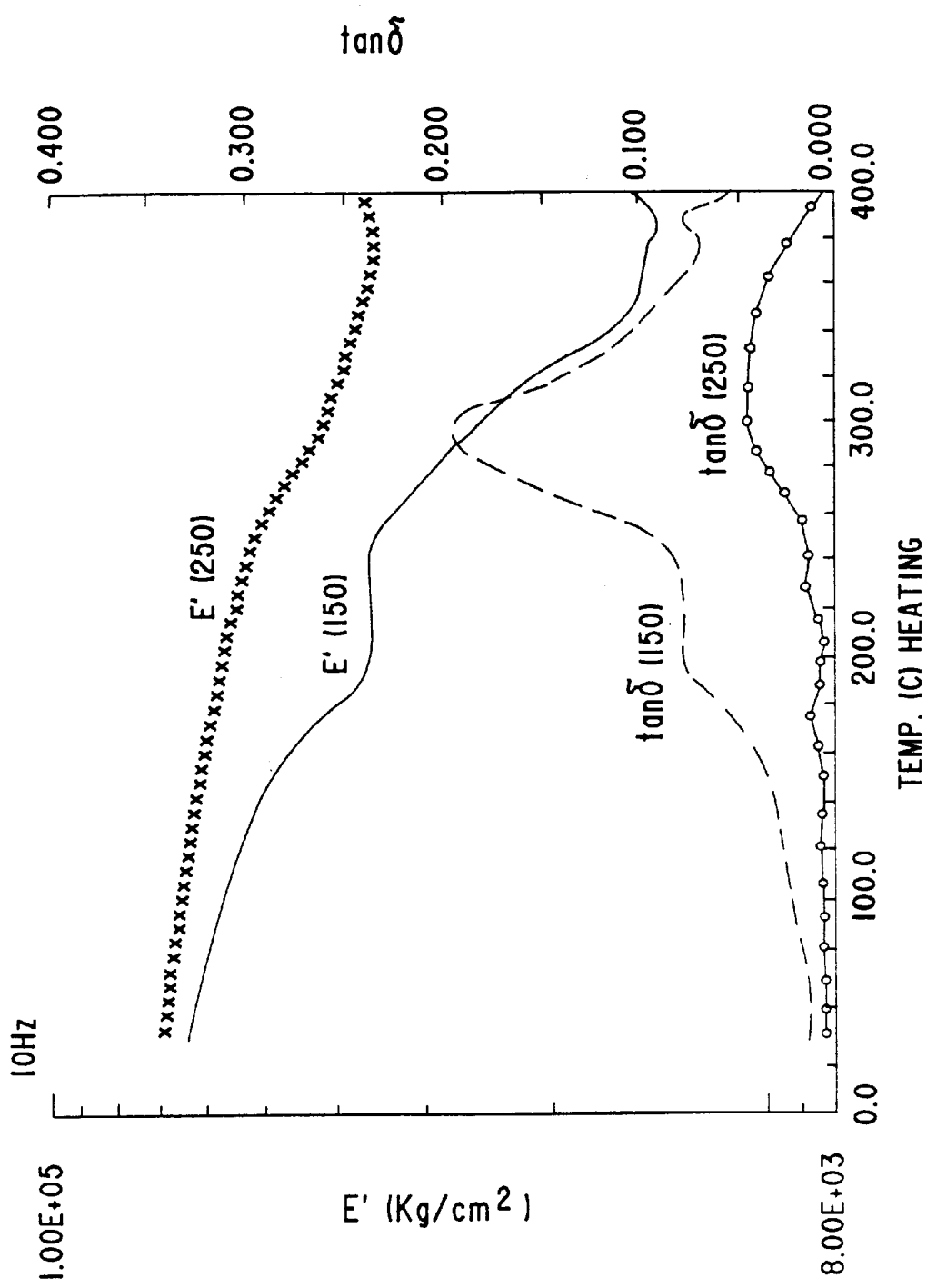
FIG. 2 is a graph illustrating the temperature dependence of tan $\delta$ and storage elastic modulus determined by the measurement of the dynamic viscoelasticity of the composite of a thermosetting resin with a metallic oxide obtained in Example 1, wherein the ordinate indicates the dynamic viscoelasticity E'[Kg/cm$^2$] and tan $\delta$ [–] and the abscissa indicates the temperature [°C.], the figure in the parentheses indicating the heat treatment temperature.
Figure 3:
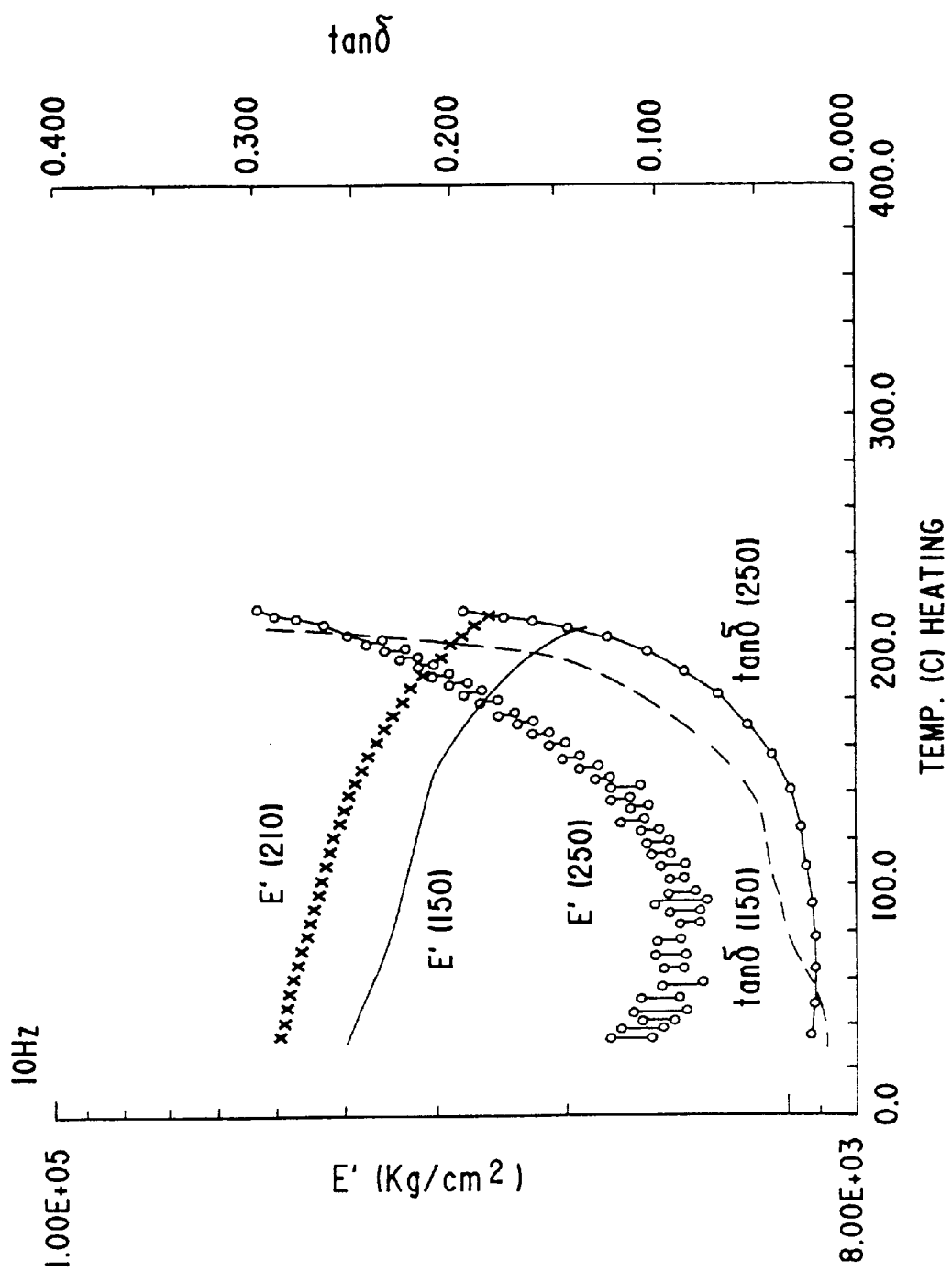
FIG. 3 is a graph illustrating the results of measurement of the dynamic viscoelasticity of the phenolic resin as a starting material used in Example 1, wherein the ordinate indicates the dynamic viscoelasticity E' [Kg/cm$^2$] and tan $\delta$ [–] and the abscissa indicates the temperature [°C.], the figure in the parentheses indicating the heat treatment temperature.

FIG. 2 shows the change with temperature of tan $\delta$ and the storage elastic modulus (E') of the sample determined by a dynamic viscoelasticity measuring apparatus (DMS200, available from Seiko Instruments Inc.). It can be seen that the sample of the present invention exhibits an excellent retention of physical properties at high temperatures (heat resistance) as compared with that of FIG. 3.

EXAMPLES 2 AND 3 AND COMPARATIVE EXAMPLE 1

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) were sequentially added dropwise a homogeneous solution comprising 18 parts by weight of tetramethylorthosilicate (available from Tokyo Kasei Kogyo K.K.), 30 parts by weight of methanol, 9 parts by weight of water and hydrochloric acid in an amount of 0.01 mol per mol of tetramethylorthosilicate (Comparative Example 1), a homogeneous solution comprising 18 parts by weight of tetramethylorthosilicate (available from Tokyo Kasei Kogyo K.K.), 30 parts by weight of methanol, 9 parts by weight of water and hydrochloric acid in an amount of 0.1 mol per mol of tetramethylorthosilicate (Example 3) and a homogeneous solution comprising 18 parts by weight of tetramethylorthosilicate (available from Tokyo Kasei Kogyo K.K.), 30 parts by weight of methanol, 9 parts by weight of water and hydrochloric acid in an amount of 0.4 mol per mol of tetramethylorthosilicate (Example 2), respectively, with stirring to prepare homogeneous liquid mixtures.

These liquid mixtures were each immediately applied to a clean glass plate. These liquid mixtures were each slowly casted at a temperature of 25° C. for about 5 hours so that the solvent was removed. Thereafter, the materials were each heated at a rate of 2° C. per minute to a temperature of 150° C. where they were then allowed to stand for 30 minutes.

The films thus obtained exhibited a silica content of 10.5% by weight. The film of Example 2 was transparent (light transmittance: 99%), and the film of Example 3 was white semitransparent (light transmittance: 75%). Both the two samples of the present invention were homogeneous and free of macroscopic phase separation. On the other hand, the film of Comparative Example 1 was a white opaque (light transmittance: 13%) heterogeneous composite.

The size of the dispersed silica particles determined by SEM were about 40 nm (Example 2) and from about 300 to 500 nm (Example 3). The dispersed silica particles showed a good adhesivity to the matrix resin in Examples 2 and 3 and a poor adhesivity to the matrix resin due to heterogeneity in the composite in Comparative Example 1.

These films were subjected to three-point bending test in the same manner as in Example 1 to determine their mechanical properties. As a result, the film of Example 2 exhibited an elastic modulus of 800 kgf/mm$^2$, a strength of 26.5 kgf/mm$^2$ and an elongation of 4.2%, and the film of Example 3 exhibited an elastic modulus of 785 kgf/mm$^2$, a strength of 24.5 kgf/mm$^2$ and an elongation of 3.8%. Thus, the properties of both the two films were superior to those of the resin alone.

On the other hand, the film of Comparative Example 1 exhibited a strength as low and poor as 8 kgf/mm$^2$ and an elongation as low and poor as 0.9% (elastic modulus was immeasurable due to great errors caused by brittleness).

EXAMPLE 4 AND COMPARATIVE EXAMPLE 2

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) were sequentially added dropwise a homogeneous solution comprising 18 parts by weight of tetramethylorthosilicate (available from Tokyo Kasei Kogyo K.K.), 18 parts by weight of methanol, 9 parts by weight of water and ammonia in an amount of 0.05 mol per mol of tetramethylorthosilicate (Example 4) and a homogeneous solution comprising 18 parts by weight of tetramethylorthosilicate (available from Tokyo Kasei Kogyo K.K.), 18 parts by weight of methanol, 9 parts by weight of water and acetic acid in an amount of 0.1 mol per mol of tetramethylorthosilicate (Comparative Example 2), respectively, with stirring to prepare homogeneous liquid mixtures (The gelation time required after preparation was 145 minutes in Example 4 and as very short as 4 minutes in Comparative Example 2).

These liquid mixtures were each immediately applied to a clean glass plate. These liquid mixtures were each slowly solvent-casted at a temperature of 25° C. for about 5 hours so that the solvent was removed. Thereafter, the materials were each heated at a rate of 2° C. per minute to a temperature of 150° C. where they were then allowed to stand for 30 minutes. The films thus obtained exhibited a silica content of about 10.5% by weight.

The film of Example 4 was slightly cloudy and transparent (light transmittance: 93%), and the film of Comparative Example 2 was almost transparent (light transmittance: 95%). Both the two samples were homogeneous and free of macroscopic phase separation. The size of the dispersed silica particles determined by SEM were about 100 nm in Example 4 and about 60 in Comparative Example 2).

The dispersed silica particles showed a good adhesivity to the matrix resin in Example 4. On the other hand, the dispersed silica particles of Comparative Example 2 had a definite interface with the resin that shows a poor wetting between the two components. These films were subjected to three-point bending test in the same manner as in Example 1 to determine their mechanical properties. As a result, the film of Example 4 exhibited an elastic modulus of 838 kgf/mm$^2$, a strength of 26.0 kgf/mm$^2$ and an elongation of 4.3%. All these values were superior to those of the resin as a starting material. On the other hand, the film of Comparative Example 2 exhibited an elastic modulus of 726 kgf/mm$^2$, a strength of 12.2 kgf/mm$^2$ and an elongation of 1.76%. Thus, the film of Comparative Example 2 showed an elastic modulus higher than that of the resin alone but a lower strength and elongation than those of the resin alone.

EXAMPLES 5 AND 6 AND COMPARATIVE EXAMPLE 3

A homogeneous solution comprising 20 parts by weight of tetramethylorthosilicate (available from Tokyo Kasei Kogyo K.K.), 20 parts by weight of methanol and 10 parts by weight of water was previously stirred at a temperature of 25° C. for a predetermined period of time so that the silicon alkoxide was subjected to hydrolysis and polycondensation (the reaction time was 10% (Example 5), 50% (Example 6) and 96% (Comparative Example 3) of the gelation time (about 40 hours).

The solutions thus obtained were each then added dropwise to a homogeneous solution obtained by adding 30 parts by weight of methanol to 100 parts by weight of a phenolic resin (Plyophen J-325, available from Dainippon Ink & Chemicals, Inc.; resol phenolic resin soluble in methanol; solid content: 60%; pH 8.2; Mw: 1,700) to prepare homogeneous liquid mixtures.

The liquid mixtures were each then stirred at a temperature of 30° C. in an airtight vessel for 15 minutes. The liquid mixtures were each then applied to a clean glass plate. The liquid mixtures were each slowly solvent-casted at a temperature of 25° C. for about 5 hours so that the solvent was removed. Thereafter, the materials were each heated at a rate of 2° C. per minute to a temperature of 150° C. where they were then allowed to stand for 50 minutes.

The heat curing reaction of the phenolic resin and the polycondensation reaction of the metal alkoxide were simultaneously effected between casting and heating. The films thus obtained exhibited a silica content (silica/(silica+resin)) of 11.5% by weight.

Both the two films of the present invention were homogeneous and transparent (light transmittance: 97% in Example 5 and 96% in Example 6). On the other hand, the film of Comparative Example 3 exhibited a light transmittance of 22% and showed phase separation and agglomeration.

The size of the dispersed silica particles determined by SEM (x 50,000) was about 50 nm in both Examples 5 and 6. The adhesivity of the dispersed silica particles to the matrix was not made clear because the particles were so small. Anyway, the dispersed silica particles showed no peeling at the interface with the resin and hence a good adhesivity to the resin. In Comparative Example 3, agglomerated particles having a diameter of about 10 μm were observed, and the particles showed a poor adhesivity to the resin.

EXAMPLES 7 TO 9

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) were sequentially added dropwise a homogeneous solution comprising 30 parts by weight of tetramethylorthosilicate (available from Tokyo Kasei Kogyo K.K.) and 40 parts by weight of methanol (Example 7), a homogeneous solution comprising 20 parts by weight of tetramethylorthosilicate, 50 parts by weight of methyl ethyl ketone and 8 parts by weight of water (Example 8) and a homogeneous solution comprising 20 parts by weight of tetramethylorthosilicate, 50 parts by weight of N-methylpyrrolidone and 8 parts by weight of water (Example 9), respectively, with stirring to prepare homogeneous liquid mixtures.

These liquid mixtures were each immediately applied to a clean glass plate. These liquid mixtures were each slowly solvent-casted at a temperature of 25° C. and a humidity of 70% for about 12 hours so that the solvent was removed.

Thereafter, the materials were each heated at a rate of 2° C. per minute to a temperature of 150° C. where they were then allowed to stand for 30 minutes.

The films thus obtained exhibited a silica content of 14.5% by weight (Example 7) and 11.0% by weight (Examples 8 and 9). These films were all transparent (light transmittance: 99% (Example 7), 98% (Example 8), 97% (Example 9)) and homogeneous composites.

The size of the dispersed silica particles determined by SEM were about 30 nm (Example 7), about 50 nm (Example 8) and about 50 nm (Example 9). In all these examples, the dispersed silica particles showed a good adhesivity at the interface with the matrix resin.

EXAMPLES 10 TO 13

To a homogeneous solution obtained by adding 20 parts by weight of methanol to 100 parts by weight of a phenolic resin (Plyophen J-325, available from Dainippon Ink & Chemicals, Inc.; resol phenolic resin soluble in methanol; solid content: 60%; pH 8.2; Mw: 1,700) were sequentially added dropwise a homogeneous solution comprising 28 parts by weight of tetramethylorthosilicate (available from Tokyo Kasei Kogyo K.K.), 30 parts by weight of methanol, 13 parts by weight of water and 2 parts by weight of monomethyltrimethoxysilane (Example 10), a homogeneous solution comprising 24 parts by weight of tetramethylorthosilicate, 30 parts by weight of methanol, 12 parts by weight of water and 6 parts by weight of monomethyltrimethoxysilane (Example 11), a homogeneous solution comprising 18 parts by weight of tetramethylorthosilicate, 30 parts by weight of methanol, 12 parts by weight of water and 12 parts by weight of monomethyltrimethoxysilane (Example 12) and a homogeneous solution comprising 28 parts by weight of tetramethylorthosilicate, 30 parts by weight of methanol, 13 parts by weight of water and 2 parts by weight of dimethyldimethoxysilane (available from Tokyo Kasei Kogyo K.K.) (Example 13), respectively, with stirring to prepare homogeneous liquid mixtures.

These liquid mixtures were each stirred at a temperature of 30° C. for 10 minutes, and then applied to a clean glass plate. These liquid mixtures were each slowly solvent-casted at a temperature of 25° C. for about 10 hours so that the solvent was removed. Thereafter, the materials were each heated at a rate of 2° C. per minute to a temperature of 150° C. where they were then allowed to stand for 45 minutes.

The films thus obtained all exhibited a silica content of about 16% by weight. These films were all transparent (light transmittance: 98% (Example 10), 98% (Example 11), 96% (Example 12), 97% (Example 13)) and homogeneous. The size of the dispersed silica particles determined by SEM were all from about 30 nm to 80 nm. In all these examples, the dispersed silica particles showed a good adhesivity at the interface with the matrix resin.

These films were subjected to three-point bending test in the same manner as in Example 1 to determine their mechanical properties. As a result, the film of Example 10 exhibited an elastic modulus of 754 kgf/mm$^2$, a strength of 29.4 kgf/mm$^2$ and an elongation of 5.0%, the film of Example 11 exhibited an elastic modulus of 732 kgf/mm$^2$, a strength of 28.4 kgf/mm$^2$ and an elongation of 4.9%, and the film of Example 13 exhibited an elastic modulus of 712 kgf/mm$^2$, a strength of 25.6 kgf/mm$^2$ and an elongation of 4.7%. Thus, the properties of these films were superior to those of the resin alone.

On the other hand, the film of Example 12 exhibited an elastic modulus of 735 kgf/mm$^2$, a strength of 19.8 kgf/mm$^2$ and an elongation of 3.5%. Thus, the film of Example 12 exhibited a higher elastic modulus and slightly higher strength and elongation that those of the resin alone.

EXAMPLE 14

To a solution obtained by dissolving 100 parts by weight of a phenolic resin (Phenolite 5510, available from Dainippon Ink & Chemicals, Inc.; novolak phenolic resin; hexamine content: 10% by weight) in a mixture of 140 parts by weight of methanol and 60 parts by weight of toluene was sequentially added dropwise a homogeneous solution comprising 30 parts by weight of tetramethylorthosilicate (available from Tokyo Kasei Kogyo K.K.), 50 parts by weight of methanol and 14 parts by weight of water with stirring to prepare a homogeneous liquid mixture.

The liquid mixture was allowed to stand at a temperature of 30° C. in an airtight vessel for 30 minutes, and then applied to a clean glass plate. The liquid mixture was slowly solvent-casted at a temperature of 25° C. for about 12 hours so that the solvent was removed. Thereafter, the material was heated at a rate of 2° C. per minute to a temperature of 150° C. where it was then allowed to stand for 30 minutes.

The film thus obtained exhibited a silica content of about 10% by weight. The film was homogeneous but was not transparent. It was white yellow opaque (light transmittance: 62%). When the sample was thicker, microfine foaming was observed. The size of the dispersed silica particles determined by SEM was about 500 nm. The particles showed a good adhesivity to the matrix resin.

EXAMPLE 15

To 100 parts by weight of a phenolic resin (Phenolite UG-1101, available from Dainippon Ink & Chemicals, Inc.; high ortho novolak phenolic resin; solid content: 70% by weight) was sequentially added dropwise a homogeneous solution comprising 17 parts by weight of tetramethylorthosilicate (available from Tokyo Kasei Kogyo K.K.), 50 parts by weight of methanol and 2 parts by weight of water with stirring to prepare a homogeneous transparent liquid mixture.

The liquid mixture was allowed to stand at a temperature if 20° C. in an airtight vessel for 1 week (it stayed transparent), and then applied to a clean glass plate. The liquid mixture was slowly solvent-casted at a temperature of 25° C. for about 12 hours so that the solvent was removed. Thereafter, the material was heated at a rate of 2° C. per minute to a temperature of 150° C. where it was then allowed to stand for 60 minutes.

The film thus obtained exhibited a silica content of about 9% by weight. The film was homogeneous and transparent (light transmittance: 91%). The sample showed no cracking and deformation. The size of the dispersed silica particles determined by SEM was about 60 nm. The particles showed a good adhesivity to the matrix resin.

EXAMPLE 16

To 100 parts by weight of a phenolic resin (Phenolite UG-1101, available from Dainippon Ink & Chemicals, Inc.; high ortho novolak phenolic resin; solid content: 70% by weight) was sequentially added dropwise a homogeneous solution comprising 13 parts by weight of MKC silicate as a low condensate of tetramethylorthosilicate (MS-51, available from Mitsubishi Kasei Corp.; molecular weight: about 500), 50 parts by weight of methanol and 1.8 parts by weight of water with stirring to prepare a homogeneous transparent liquid mixture.

The liquid mixture was allowed to stand at a temperature of 25° C. in an airtight vessel for 12 hours (it stayed transparent), and then applied to a clean glass plate. The liquid mixture was slowly solvent-casted at a temperature of 25° C. for about 12 hours so that the solvent was removed. Thereafter, the material was heated at a rate of 2° C. per minute to a temperature of 150° C. where it was then allowed to stand for 60 minutes.

The film thus obtained exhibited a silica content of about 8.5% by weight. The film was homogeneous and transparent (light transmittance: 89%). The sample showed no cracking and deformation. The size of the dispersed silica particles determined by SEM was about 70 nm. The particles showed a good adhesivity to the matrix resin.

EXAMPLE 17

To 100 parts by weight of a phenolic resin (Plyophen J-325, available from Dainippon-Ink & Chemicals, Inc.; resol phenolic resin soluble in methanol; solid content: 60% by weight) was sequentially added dropwise a homogeneous solution comprising 20 parts by weight of tetramethylorthosilicate (available from Tokyo Kasei Kogyo K.K.), 2 parts by weight of tetraethylorthotitanate (available from Tokyo Kasei Kogyo K.K.), 50 parts by weight of methanol, 40 parts by weight of tetrahydrofuran and 1.5 parts by weight of water with stirring to prepare a homogeneous liquid mixture.

The liquid mixture was allowed to stand at a temperature of 30° C. in an airtight vessel for 30 minutes, and then applied to a clean glass plate. The liquid mixture was slowly solvent-casted at a temperature of 25° C. for about 5 hours so that the solvent was removed. Thereafter, the material was heated at a rate of 2° C. per minute to a temperature of 150° C. where it was then allowed to stand for 30 minutes.

The sum of the silica and titania contents of the film thus obtained was about 12% by weight. The film was homogeneous and transparent (light transmittance: 96%). The size of the dispersed particles determined by SEM was from about 40 to 80 nm. The particles showed a good adhesivity to the matrix resin.

EXAMPLE 18

To a mixture of 80 parts by weight of a phenolic resin (Plyophen J-325, available from Dainippon Ink & Chemicals, Inc.; resol phenolic resin soluble in methanol; solid content: 60% by weight) and 20 parts by weight of an epoxy resin (Epiclon 850: bisphenol A epoxy resin available from Dainippon Ink & Chemicals, Inc.) was sequentially added dropwise a homogeneous solution comprising 15 parts by weight of tetramethylorthosilicate (available from Tokyo Kasei Kogyo K.K.), 20 parts by weight of methanol and 2 parts by weight of water with stirring to prepare a liquid mixture.

The liquid mixture was allowed to stand at a temperature of 30° C. in an airtight vessel for 1 hour, and then applied to a clean glass plate. The liquid mixture was slowly solvent-casted at a temperature of 25° C. for about 5 hours so that the solvent was removed. Thereafter, the material was heated at a rate of 2° C. per minute to a temperature of 150° C. where it was then allowed to stand for 30 minutes.

The film thus obtained exhibited a silica content of 7.5% by weight. The film was homogeneous and transparent (light transmittance: 97%). The size of the dispersed silica particles determined by SEM was from about 40 nm to 60 nm. The adhesivity of the dispersed silica particles to the matrix was not made clear because the particles were so small. Anyway, the dispersed silica particles showed no peeling at the interface with the resin and hence a good adhesivity to the resin.

EXAMPLE 19

To 100 parts by weight of a phenolic resin (Plyophen J-325, available from Dainippon Ink & Chemicals, Inc.; resol phenolic resin soluble in methanol; solid content: 60% by weight) was sequentially added dropwise a homogeneous solution comprising 20 parts by weight of MKC silicate as a low condensate of tetramethylorthosilicate (MS-56, available from Mitsubishi Kasei Corp.; molecular weight: about 1,000), 35 parts by weight of methanol, 2 parts by weight of water and acetic acid in an amount of 0.01 mol per mol of tetramethylorthosilicate with stirring to prepare a homogeneous liquid mixture.

The liquid mixture was allowed to stand at a temperature of 30° C. in an airtight vessel for 1 hour, and then applied to a clean glass plate. The liquid mixture was slowly solvent-casted at a temperature of 25° C. for about 5 hours so that the solvent was removed. Thereafter, the material was heated at a rate of 2° C. per minute to a temperature of 150° C. where it was then allowed to stand for 30 minutes.

The film thus obtained exhibited a silica content of 16.1% by weight. The film was homogeneous and transparent (light transmittance: 98%). The size of the dispersed silica particles determined by SEM was about 50 nm. The adhesivity of the dispersed silica particles to the matrix was not made clear because the particles were so small. Anyway, the dispersed silica particles showed no peeling at the interface with the resin and hence a good adhesivity to the resin.

The film was subjected to three-point bending test (shape of sample: 5.0 mm wide×30 mm long×0.35 mm thick; span distance: 15 mm) to determine its mechanical properties. As a result, the film showed an elastic modulus of 762 kgf/mm$^2$, a strength of 29.2 kgf/mm$^2$ and an elongation of 5.25%. All these values exceeded those of the starting resin alone (elastic modulus: 545 kgf/mm$^2$; strength: 17.0 kgf/mm$^2$; elongation: 3.0%).

EXAMPLE 20

To 190 parts by weight of a phenolic resin (Plyophen J-325, available from Dainippon Ink & Chemicals, Inc.; resol phenolic resin soluble in methanol; solid content: 60% by weight) was sequentially added dropwise a homogeneous solution comprising 18 parts by weight of tetramethylorthosilicate (available from Tokyo Kasei Kogyo K.K.), 30 parts by weight of methanol and 9 parts by weight of water with stirring to prepare a homogeneous liquid mixture.

A nonwoven glass fabric (Cumulass EPM-4100 Japan Vilene Co., Ltd.; weight: 100 g/m$^2$; thickness: 0.75 mm) was immediately impregnated with the liquid mixture. The impregnated nonwoven glass fabric was then air-dried at a temperature of 25° C. for about 5 hours so that the solvent was slowly removed. Thereafter, the material was heated to a temperature of 130° C. for 3 minutes, and then pressed at a temperature of 150° C. and a pressure of 40 kg/cm$^2$ for 40 minutes.

The impregnated material thus obtained was then compared with another sample comprising the same nonwoven glass fabric impregnated with the phenolic resin alone in mechanical properties. As a result of tensile test, the present sample showed a tensile strength increase from 6.8 kgf/mm$^2$ to 8.3 kgf/mm$^2$, a tensile modulus increase from 330 kgf/mm$^2$ to 370 kgf/mm$^2$ and an elongation at break increase from 2.5% to 3.7%.

EXAMPLE 21

A homogeneous liquid mixture was prepared in the same manner as in Example 20 except that the amount of methanol was 200 parts by weight. Thereafter, the liquid mixture was stirred at a temperature of 30° C. in an airtight vessel for about 2 hours. A nonwoven glass fabric (Cumulass EPM-4100 Japan Vilene Co., Ltd.; weight: 100 g/m$^2$; thickness: 0.75 mm) was then impregnated with the liquid mixture. The impregnated nonwoven glass fabric was squeezed so that the resin solution in excess of that required for surface sizing was removed, and then dried at a temperature of 80° C. for a short period of time. The composite was observed to be homogeneously attached to the surface of the glass fiber under SEM.

The attachment of the composite was 2.3% per unit weight of glass. The nonwoven glass fabric thus treated was impregnated with the phenolic resin J-325, dried, and then press-molded at a temperature of 150° C. in the same manner as in Example 20. The sample thus obtained was then subjected to tensile test. As a result, the sample exhibited excellent tensile properties, i.e., strength of 7.3 kg/mm$^2$, elastic modulus of 334 kg/mm$^2$ and elongation of 2.9%.

EXAMPLE 22

To 100 parts by weight of a phenolic resin (Plyophen J-325, available from Dainippon Ink & Chemicals, Inc.; resol phenolic resin soluble in methanol; solid content: 60% by weight) was sequentially added dropwise a homogeneous solution comprising 25 parts by weight of tetraethylorthosilicate (available from Tokyo Kasei Kogyo K.K.), 50 parts by weight of ethanol and 8 parts by weight of water with stirring to prepare a homogeneous liquid mixture.

The liquid mixture thus prepared was immediately applied to a clean glass plate. The liquid mixture was slowly solvent-casted at a temperature of 25° C. for about 5 hours so that the solvent was removed. Thereafter, the material was heated at a rate of 2° C. per minute to a temperature of 150° C. where it was then allowed to stand for 30 minutes.

The film thus obtained exhibited a silica content of 10.5% by weight. The film was cloudy and semitransparent (light transmittance: 58%) and showed no macroscopic phase separation. The size of the dispersed silica particles determined by SEM was about 600 nm.

EXAMPLES 23 AND 24

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) was sequentially added dropwise a homogeneous solution comprising 10 parts by weight of tetramethylorthosilicate (available from Tokyo Kasei Kogyo K.K.), 45 parts by weight of methanol and 5 parts by weight of water (Example 23) and a homogeneous solution comprising 37 parts by weight of tetramethylorthosilicate, 45 parts by weight of methanol and 21 parts by weight of water (Example 24), respectively, with stirring to prepare homogeneous liquid mixtures.

The liquid mixtures thus obtained were each allowed to stand at a temperature of 30° C. in an airtight vessel for 1 hour, and then applied to a clean polypropylene plate. The liquid mixtures were each slowly solvent-casted at a temperature of 25° C. for about 10 hours so that the solvent was removed. The casted materials thus obtained were each peeled off the polypropylene plate, ground to particles having an average particle diameter of 1 mm, and then allowed to stand at a temperature of 110° C. for 60 minutes (Example 23) and at a temperature of 70° C. for 60 minutes (Example 24) to obtain composites.

The complexes thus obtained exhibited an apparent solvent content of 1.8% by weight (Example 23) and 16.5% by weight (Example 24). Thereafter, the composite particles were packed into a mold, and then molded at a temperature of 150° C. and a pressure of 35 kg/cm$^2$ for about 15 minutes by a hot press to obtain molded complexes having a thickness of 3 mm, a length of 55 mm and a width of 7 mm.

The silica content (silica/(silica+resin)) of the molded complexes thus obtained were 6.2% by weight (Example 23) and 20.1% by weight (Example 24). These products were homogeneous molded products free of crack, warpage and twist. The molded product of Example 23 was transparent (light transmittance: 97%) while the molded product of Example 24 was cloudy and opaque (light transmittance: 15%).

The size of the dispersed silica particles determined by SEM (x 50,000) was about 50 nm (Example 23) and about 2,000 nm (Example 24). The dispersed silica particles showed no peeling at the interface with the matrix resin and hence a good adhesivity to the matrix resin.

COMPARATIVE EXAMPLE 4

A particulate composite was prepared in the same manner as in Example 23 except that the drying of the particles thus ground was effected at a temperature of 120° C. for 60 minutes. The composite thus obtained exhibited an apparent solvent content of 0.81% by weight. Thereafter, the particulate composite was hot-pressed in the same manner as in Example 23 to obtain a molded composite. The molded composite thus obtained exhibited a silica content of 6.3% by weight. The molded composite thus obtained was a semitransparent (light transmittance: 60%) heterogeneous composite having interfaces of composite particles left on the surface thereof or thereinside.

EXAMPLES 25 AND 26

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) were sequentially added dropwise a homogeneous solution comprising 18 parts by weight of tetramethylorthosilicate (available from Tokyo Kasei Kogyo K.K.), 30 parts by weight of methanol, 9 parts by weight of water and hydrochloric acid in an amount of 0.01 mol per mol of tetramethylorthosilicate (Example 25) and a homogeneous solution comprising 18 parts by weight of tetramethylorthosilicate, 30 parts by weight of methanol, 9 parts by weight of water and hydrochloric acid in an amount of 0.1 mol per mol of tetramethylorthosilicate (Example 26), respectively, with stirring to prepare homogeneous liquid mixtures.

These liquid mixtures were each slowly solvent-casted at a temperature of 25° C. for about 1 hour so that a part of the solvent was removed. The casted materials were each molded into pellets having a diameter of about 5 mm. These pellets were then subjected to casting at a temperature of 40° C. for about 2 hours and then at a temperature of 120° C. for 15 minutes so that the solvent was removed. The pelletized composites thus obtained exhibited a solvent content of about 4% by weight in both Examples 18 and 19.

Thereafter, these pelletized composites were molded by a small-sized extrusion molding machine (maximum temperature: 150° C.) into a form having the same size as that of Example 23 (thick form) and a form having a thickness of 0.5 mm, a width of 5 mm and a length of 30 mm (thin form). These molded products were then annealed at a temperature of about 170° C. for 15 minutes to obtain final molded products. These molded products thus obtained exhibited a silica content of 10.5% by weight in both Examples 25 and 26. These molded products were homogeneous and free of cracking regardless of their thickness.

The molded product of Example 25 was transparent (light transmittance: 95%), and the molded product of Example 26 was white semitransparent (light transmittance: 60%). Both the two molded products were homogeneous and free of macroscopic phase separation.

The light transmittance herein is determined by the ratio of converted transmitted light to incident light (($I^*/I_o$)×100) with respect to 800 nm light wherein $I^*$ is exp {lnI/(d/100)} (in which d is the thickness of the film ($\mu$m)). On the other hand, the size of the dispersed silica particles determined by SEM was about 60 nm (Example 25) and about 500 nm (Example 26).

The dispersed silica particles exhibited a good adhesivity to the matrix resin in both Examples 25 and 26. The molded products in a thin form were subjected to three-point bending test (span distance: 15 mm) to determine their mechanical properties. The molded product of Example 25 exhibited an elastic modulus of 810 kgf/mm$^2$, a strength of 26 kgf/mm$^2$ and an elongation of 4.0%, and the molded product of Example 26 exhibited an elastic modulus of 790 kgf/mm$^2$, a strength of 25 kgf/mm$^2$ and an elongation of 3.9%. Thus, both the molded products of Examples 25 and 26 were superior to the resin alone in mechanical properties.

EXAMPLE 27

100 parts by weight of the same composite as used in Example 25 were melt-kneaded with 30 parts by weight of milled carbon fiber (Donacarbo S-241, available from Donac Co., Ltd.) by means of a simple injection molding machine, and then molded at a temperature of 160° C. into a mold having a thickness of 2 mm, a width of 5 mm and a length of 30 mm. The molded product thus obtained was homogeneous and showed no cracking. The size of the dispersed silica particles determined by SEM was from about 60 nm to 80 nm.

EXAMPLE 28

To a homogeneous solution obtained by adding 100 parts by weight of methanol to 100 parts by weight of a phenolic resin (Phenolite 5510, available from Dainippon Ink & Chemicals, Inc.; novolak phenolic resin; hexamine content: 10% by weight) was sequentially added dropwise a homogeneous solution comprising 30 parts by weight of tetramethylorthosilicate (available from Tokyo Kasei Kogyo K.K.), 50 parts by weight of methanol and 14 parts by weight of water with stirring to prepare a homogeneous liquid mixture.

The liquid mixture was allowed to stand at a temperature of 30° C. in an airtight vessel for 1 hour, slowly casted in a clean polystyrene vessel for about 12 hours so that the solvent was removed, gradually heated to a temperature of 65° C. in vacuo for 2 hours, allowed to stand at the same temperature for 1 hour, and then ground to particles having a particle diameter of about 50 $\mu$m. The particles thus obtained were then dried at a temperature of 80° C. for 5 hours to remove methanol therefrom. The particles exhibited an apparent solvent content of 0.89% by weight. The particles were packed into a mold (10 mm wide×60 mm long×2 mm thick), press-molded at a temperature of 150° C. and a pressure of 25 kg/cm$^2$ for 30 minutes, and then heat-treated at a temperature of 150° C. for 45 minutes.

The molded product thus obtained exhibited a silica content (silica/(silica+resin)) of 10.4% by weight. The molded product was cloudy and opaque but was homogeneous. The size of the dispersed silica particles determined by SEM (x 30,000) was about 8,000 nm. The dispersed silica particles exhibited a good adhesivity to the matrix resin.

The molded product was subjected to three-point bending test (shape of sample: 10 mm wide×60 mm long×2 mm thick; span distance: 30 mm) to determine its mechanical properties. As a result, the molded product showed an elastic modulus of 620 kgf/mm$^2$, a strength of 14.6 kgf/mm$^2$ and an elongation of 2.45%. All these values exceeded those of the thermosetting resin as a starting material (elastic modulus: 569 kgf/mm$^2$; strength: 8.8 kgf/mm$^2$; elongation: 1.59%).

EXAMPLES 29 AND 30

To 100 parts by weight of a phenolic resin (Plyophen J-325, available from Dainippon Ink & Chemicals, Inc.; resol phenolic resin soluble in methanol; solid content: 60% by weight) was added dropwise a homogeneous solution comprising 17 parts by weight of tetramethylorthosilicate (available from Tokyo Kasei Kogyo K.K.), 45 parts by weight of methanol and 8 parts by weight of water with stirring to prepare a homogeneous liquid mixture.

The liquid mixture was allowed to stand at a temperature of 30° C. in an airtight vessel for 15 minutes, slowly solvent-casted in a clean polystyrene vessel for 3 days so that the solvent was removed, and then heated at a rate of 2° C. per minute to a temperature of 80° C. where it was then allowed to stand for 10 hours. The casted material was withdrawn from the polystyrene vessel, and then heated at a rate of 2° C. per minute to a temperature of 150° C. where it was then allowed to stand for 45 minutes to obtain a desired composite of a phenolic resin with a silica.

The composite thus obtained exhibited a silica content (silica/(silica+resin)) of 9.90% by weight. As a result, homogeneous and transparent (light transmittance: 97%) casted products having a thickness of 0.3 mm (Example 29) and 0.6 mm (Example 30) were obtained. These molded products showed no cracking.

The size of the dispersed silica particles determined by SEM (x 30,000) was about 50 nm. The dispersed silica particles exhibited a good adhesivity to the matrix resin.

The casted products were subjected to impact resistance test in the same manner as specified in JIS-K5400 (1979) except that the examination was effected with varying mass of the weight and with the weight falling distance fixed to 20 cm. For the evaluation of impact resistance, the minimum mass G at which the sample is cracked or broken was determined (5 measurements were averaged hereinafter). In Example 29 (thickness of casted material: 0.3 mm), G was 36 g. In Example 30 (thickness of casted material: 0.6 mm), G was 62 g. These values were higher than that of the sample obtained with the resin alone (G: 20 g for 0.3 mm thick casted product and 24 g for 0.6 mm thick casted product), proving that the present sample exhibits a drastically enhanced impact resistance.

COMPARATIVE EXAMPLES 5 AND 6

100 parts by weight of a phenolic resin (Plyophen J-325, available from Dainippon Ink & Chemicals, Inc.; resol phenolic resin soluble in methanol; solid content: 60%; pH 8.2; Mw: 1,700) were homogeneously mixed with 30 parts by weight of methanol and 10 parts by weight of milled glass fiber (REVX0025, available from Nippon Sheet Glass Co., Ltd.; 9 $\mu$m diameter×60 $\mu$m long) (Comparative Example 5) or 10 parts by weight of a particulate glass (MKC Silica, available from Mitsubishi Kasei Corp.; particle diameter: 1.7 μm) (Comparative Example 6).

When these liquid mixtures were allowed to stand, they became heterogeneous due to the difference in specific gravity between glass and resin solution.

These liquid mixtures were each immediately applied to a clean glass plate. Thereafter, these liquid mixtures were each slowly solvent-casted at a temperature of 25° C. for about 5 hours so that the solvent was removed. The casted materials were each heated at a rate of 2° C. per minute to a temperature of 150° C. where it was then allowed to stand for 30 minutes. Both the two film samples were cloudy and opaque and had glass heterogeneously distributed therein. In Comparative Example 5, milled glass fiber was observed accumulated at the bottom of the film.

These film samples were subjected to three-point bending test in the same manner as in Example 1 to determine their mechanical properties. As a result, these film samples exhibited reduced mechanical properties, i.e., strength of 9.8 kgf/mm$^2$ and elongation of 1.2% (Comparative Example 5) and strength of 11.1 kgf/mm$^2$ and elongation of 2.2% (Comparative Example 6).

COMPARATIVE EXAMPLE 7

100 parts by weight of bisphenol A (available from Tokyo Kasei Kogyo K.K.) were mixed with 50 parts by weight of tetramethylorthosilicate and 2.5 parts by weight of p-toluenesulfopic acid as a catalyst. The reaction mixture was then allowed to undergo reaction at a temperature of from 110° C. to 120° C. for 4 hours. The reaction mixture was then heated to a temperature of 170° C. while methanol produced by the reaction was being distilled off. The reaction was allowed to proceed until the stoichiometrical amount of methanol was distilled off. The resulting reaction product was then diluted with xylene to obtain a transparent liquid with a volatile content of 50%.

The transparent liquid thus obtained was allowed to stand at a temperature of 30° C. in an airtight vessel for 30 minutes, and then applied to a clean glass plate. Thereafter, the liquid was slowly solvent-casted at a temperature of 25° C. for about 15 hours so that the solvent was removed. The film thus obtained showed an ununiform and opaque agglomeration. Thus, a homogeneous film was not obtained. When the thickness of the film sample was not less than 100 μm, silica agglomeration and phase separation were observed at the bottom of the film.

COMPARATIVE EXAMPLES 8 AND 9

To a homogeneous solution obtained by adding 30 parts by weight of methanol to 100 parts by weight of a phenolic resin (Plyophen J-325, available from Dainippon Ink & Chemicals, Inc.; resol phenolic resin soluble in methanol; solid content: 60%; pH 8.2; Mw: 1,700) were added dropwise a homogeneous solution comprising 22 parts by weight of a silica sol (silica sol soluble in methanol, available from Nissan Chemical Industries, Ltd.; solid content: 30.3%; particle diameter: 10–15 nm) and 10 parts by weight of methanol (Comparative Example 8) and a homogeneous solution comprising 7 parts by weight of an aerogel (available from Nihon Aerogel K.K.; particle diameter: 7 nm) and 20 parts by weight of methanol (Comparative Example 9), respectively, with stirring to prepare homogeneous liquid mixtures.

These liquid mixtures were each allowed to stand at a temperature of 30° C. in an airtight vessel for 1 hour, and then applied to a clean glass plate. The liquid mixtures were each slowly solvent-casted at a temperature of 25° C. for about 5 hours so that the solvent was removed. Thereafter, the materials were heated at a rate of 2° C. per minute to a temperature of 150° C. where they were then allowed to stand for 50 minutes.

Referring to the transparency of film, the sample of Comparative Example 8 was transparent (light transmittance: 97%), and the sample of Comparative Example 9 was cloudy and semitransparent (light transmittance: 60%).

The film sample of Comparative Example 8 was subjected to three-point bending test in the same manner as in Example 1 to determine its mechanical properties. As a result, the film sample exhibited an elastic modulus of 606 kgf/mm$^2$, a strength of 18.8 kgf/mM$^2$ and an elongation of 3.60%, which showed a slight increase from those of the thermosetting resin alone but a big drop from those of the samples of the present invention.

COMPARATIVE EXAMPLE 10

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) was sequentially added dropwise a homogeneous solution comprising 90 parts by weight of tetramethylorthosilicate (available from Tokyo Kasei Kogyo K.K.), 50 parts by weight of methanol and 50 parts by weight of water with stirring to prepare a homogeneous liquid mixture.

The liquid mixture was immediately applied to a clean glass plate. Thereafter, the liquid mixture was slowly solvent-casted at a temperature of 25° C. for about 5 hours so that the solvent was removed. Thereafter, the material was heated at a rate of 2° C. per minute to a temperature of 150° C. where it was then allowed to stand for 30 minutes.

The film thus obtained exhibited a silica content of 37.5% by weight (0.60% by weight as calculated in terms of silica/resin ratio). The film thus obtained was transparent (light transmittance: 96%). However, the film thus obtained was subject to numerous cracking that caused the composite to be divided. Thus, the sample could not be measured for strength, etc.

COMPARATIVE EXAMPLE 11

To a mixture of 100 parts by weight of an epoxy resin (Epiclon 850: bisphenol A epoxy resin available from Dainippon Ink & Chemicals, Inc.) and 20 parts by weight of a hardener (Epiclon B-053, aliphatic polyamine available from Dainippon Ink & Chemicals, Inc.) was sequentially added dropwise a homogeneous solution comprising 30 parts by weight of tetramethylorthosilicate (available from Tokyo Kasei Kogyo K.K.), 40 parts by weight of methanol and 14 parts by weight of water with stirring. During the mixing, the solution became cloudy and heterogeneous. Thus, a homogeneous composite as prepared in the previous examples was not obtained.

COMPARATIVE EXAMPLE 12

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) was sequentially added dropwise a homogeneous solution comprising 20 parts by weight of tetraethylorthotitanate (available from Tokyo Kasei Kogyo K.K.) and 80 parts by weight of THF with stirring. However, the moment the addition began precipitation occurred. Thus, no homogeneous liquid mixture was obtained. Accordingly, no homogeneous composite was obtained from the liquid mixture.

EXAMPLES 31 AND 32

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) were added dropwise a homogeneous solution comprising 18 parts by weight of tetramethylorthosilicate (available from Tokyo Kasei Kogyo K.K.), 50 parts by weight of methanol and 9 parts by weight of water (Example 31) and a homogeneous solution comprising 12 parts by weight of tetramethylorthosilicate, 45 parts by weight of methanol and 6 parts by weight of water (Example 32), respectively, with stirring to prepare homogeneous liquid mixtures.

The liquid mixtures were each allowed to stand with stirring at a temperature of 30° C. in an airtight vessel for 15 minutes, slowly solvent-casted in a clean polystyrene vessel for 7 days so that the solvent was removed, and then heated at a rate of 2° C. per minute to a temperature of 40° C., 50° C., 60° C. and 70° C. where they were then allowed to stand for 2 hours respectively. The materials were then allowed to stand at a temperature of 80° C. for 10 hours. The materials were withdrawn from the polystyrene vessel, and then heated at a rate of 2° C. per minute to a temperature of 150° C. where they were then allowed to stand for 45 minutes to accelerate the curing reaction of the phenolic resin and the polycondensation reaction of the metal alkoxide. As a result, a desired sliding material made of a composite of a phenolic resin with a silica was obtained.

In Example 31, the cast composite obtained was a 2 mm thick homogeneous transparent (light transmittance: 97%) product having a silica content (silica/(silica+resin)) of 10.5% by weight. In Example 32, the cast composite obtained was a 2 mm thick homogeneous transparent (light transmittance: 98%) product having a silica content of 7.2% by weight.

Neither of the molded products of Examples 31 and 32 showed cracking.

The size of the dispersed silica particles determined by SEM (x 30,000) was about 60 mn (Example 31) and about 50 nm (Example 32). The dispersed silica particles showed no peeling at the interface with the matrix resin and hence a good adhesivity to the matrix resin.

These cast products were subjected to frictional wear test in accordance with JIS K 7218 (shape of sample: 50 mm×50 mm×2 mm; carbon steel used: S-45C; rotational speed V of carbon steel: 50 m/min) to determine their tribological properties. When the product PV of the interface contact pressure (P (kg/cm$^2$)) and the speed (V (m/min)) was 500 kg/cm$^2$m/min, the sample of Example 31 exhibited a friction coefficient of 0.14 and the sample of Example 32 exhibited a friction coefficient of 0.15. When PV was 1,000 kg/cm$^2$•m/min, the sample of Example 31 exhibited a friction coefficient of 0.08 and an abrasion wear of 0.34 mg/min and the sample of Example 32 exhibited a friction coefficient of 0.09 and an abrasion wear of 0.92 mg/min. It can be thus seen that both the cast products of Examples 31 and 32 exhibit lower friction coefficients and abrasion wear than those of the resin alone (friction coefficient where PV is 500: 0.59; friction coefficient and abrasion wear when PV is 1,000: 0.31 and 1.73 mg/min, respectively) and hence excellent sliding properties.

EXAMPLE 33

To 100 parts by weight of a phenolic resin (Plyophen J-325, available from Dainippon Ink & Chemicals, Inc.; resol phenolic resin soluble in methanol; solid content: 60%; pH 8.2; Mw: 1,700) was added dropwise a homogeneous solution comprising 20 parts by weight of tetramethylorthosilicate (available from Tokyo Kasei Kogyo K.K.), 40 parts by weight of methanol, 10 parts by weight of water and acetic acid in an amount of 0.1 mol per mol of tetramethylorthosilicate with stirring to prepare a homogeneous liquid mixture.

The liquid mixture was then reacted and solvent-casted in the same manner as in Example 31 to obtain a sliding material made of a homogeneous semitransparent composite of a phenolic resin with silica. The composite thus obtained exhibited a silica content (silica/(silica+resin)) of 11.8% by weight. The composite was a 2 mm thick homogeneous crack-free semitransparent (light transmittance: 60%) product.

The size of the dispersed silica particles determined by SEM (x 30,000) was from about 400 nm to 600 nm. The dispersed silica particles showed no macroscopic phase separation and hence a good adhesivity to the resin. The sample was subjected to frictional wear test (JIS K 7218) in the same manner as in Example 31. When PV was 500 kg/cm$^2$•m/min, the sample exhibited a friction coefficient of 0.15. When PV was 1,500 kg/cm$^2$•m/min, the sample exhibited a friction coefficient of 0.05 and an abrasion wear of 0.51 mg/min. It can be thus seen that the cast product of Examples 33 exhibits lower friction coefficients and abrasion wear than those of the resin alone (friction coefficient where PV is 500: 0.59; friction coefficient and abrasion wear when PV is 1,500: 0.19 and 1.73 mg/min, respectively) and hence excellent sliding properties.

EXAMPLE 34

To 100 parts by weight of a phenolic resin (Plyophen J-325, available from Dainippon-Ink & Chemicals, Inc.; resol phenolic resin soluble in methanol; solid content: 60%; pH 8.2; Mw: 1,700) was added dropwise a homogeneous solution comprising 26 parts by weight of tetramethylorthosilicate (available from Tokyo Kasei Kogyo K.K.), 45 parts by weight of methanol and 14 parts by weight of water with stirring to prepare a homogeneous liquid mixture.

The liquid mixture was allowed to stand at a temperature of 30° C. in an airtight vessel for 10 minutes, slowly solvent-casted in a clean polystyrene vessel for 2 days so that the solvent was removed, and then heated at a rate of 2° C. per minute to a temperature of 80° C. where it was then allowed to stand for 8 hours. The cast material was withdrawn from the polystyrene vessel, and then ground to particles having a particle diameter of about 1 mm. The particles were packed into a mold (2 mm thick spacer), and then press-molded at a temperature of 150° C. and a pressure of 15 kg/cm$^2$ for 45 minutes.

The molded product thus obtained was a 2 mm thick homogeneous transparent (light transmittance: 95%) product having a silica content (silica/(silica+resin)) of 15.2% by weight. The size of the dispersed silica particles determined by SEM (x 30,000) was about 70 nm. The dispersed silica particles showed no peeling at the interface with the matrix resin and hence a good adhesivity to the matrix resin.

The molded product was subjected to frictional wear test in the same manner as in Example 31 (JIS K 7218; carbon steel used: S-45C; rotational speed V of carbon steel: 50 m/min) to determine their tribologicall properties. When PV was 500 kg/cm$^2$•m/min, the sample exhibited a friction coefficient of 0.13. When PV was 1,500 kg/cm$^2$•m/min, the sample exhibited a friction coefficient of 0.07 and a critical PV value of 3,500 kg/cm$^2$•m/min. It can be thus seen that the sample of Examples 34 exhibits a lower friction coefficient and a higher critical PV value than those of the resin alone (friction coefficient where PV is 500: 0.24; friction coefficient and critical PV value when PV is 1,500: 0.13 and 2,000 kg/cm$^2$•m/min, respectively) and hence excellent sliding properties.

EXAMPLE 35

To a solution obtained by dissolving 100 parts by weight of a phenolic resin (Phenolite 5510, available from Dainippon Ink & Chemicals, Inc.; novolak phenolic resin; hexamine content: 10% by weight) in a mixture of 90 parts by weight of methanol and 60 parts by weight of toluene was added dropwise a homogeneous solution comprising 30 parts by weight of tetramethylorthosilicate (available from Tokyo Kasei Kogyo K.K.), 30 parts by weight of methanol and 14 parts by weight of water with stirring to prepare a homogeneous liquid mixture.

The liquid mixture was allowed to stand with stirring at a temperature of 30° C. in an airtight vessel for 30 minutes, slowly solvent-casted-in a polystyrene vessel for 3 days, and then heated at a rate of 2° C. per minute to a temperature of 60° C. and 70° C. where it was then allowed to stand for 2 hours, respectively, and then to a temperature of 80° C. where it was then allowed to stand for 8 hours. The casted material was withdrawn from the polystyrene vessel, and then ground to particles having a particle diameter of about 1 mm. The particles were packed into a mold (2 mm thick spacer), and then press-molded under the same conditions as used in Example 32.

The molded product thus obtained was a 2 mm thick homogeneous cloudy opaque (light transmittance: 6%) product having a silica content (silica/(silica+resin)) of 10.8% by weight. The size of the dispersed silica particles determined by SEM (x 30,000) was about 1,000 nm. The dispersed silica particles showed a good adhesivity to the matrix resin.

The molded product was subjected to frictional wear test in the same manner as in Example 31 (JIS K 7218; carbon steel used: S-45C; rotational speed V of carbon steel: 50 m/min) to determine their tribological properties. When PV was 500 kg/cm$^2$•m/min, the sample exhibited a friction coefficient of 0.14. When PV was 1,500 kg/cm$^2$•m/min, the sample exhibited a friction coefficient of 0.10. It can be thus seen that the sample of Example 35 exhibits a lower friction coefficient than that of the resin alone (friction coefficient where PV is 500: 0.65; friction coefficient when PV is 1,500: 0.19) and hence excellent sliding properties.

EXAMPLE 36

To a solution obtained by mixing 100 parts by weight of a phenolic resin (Plyophen J-325, available from Dainippon Ink & Chemicals, Inc.; resol phenolic resin soluble in methanol; solid content: 60%; pH 8.2; Mw: 1,700) with 10 parts by weight of carbon fiber SG-241 with thorough stirring was added dropwise a homogeneous solution comprising 22 parts by weight of tetramethylorthosilicate (available from Tokyo Kasei Kogyo K.K.), 50 parts by weight of methanol and 10 parts by weight of water with stirring to prepare a homogeneous ,black liquid mixture.

The liquid mixture was allowed to stand with stirring at a temperature of 30° C. in an airtight vessel for 10 minutes, slowly solvent-casted in a polystyrene vessel for 5 days, and then heated at a rate of 2° C. per minute to a temperature of 50° C., 60° C. and 70° C. where it was then allowed to stand for 2 hours, respectively, and then to a temperature of 80° C. where it was then allowed to stand for 8 hours. The casted material was withdrawn from the polystyrene vessel, and then heated at a rate of 2° C. per minute to a temperature of 150° C. where it was then allowed to stand for 45 minutes to accelerate the curing reaction of the phenolic resin and the polycondensation reaction of the metal alkoxide. Thus, a carbon fiber-filled casted product was obtained.

The casted product thus obtained was a 2 mm thick homogeneous black opaque (light transmittance: 0%) product having a silica content (silica/(silica+resin)) of 12.1% by weight and a carbon fiber content of 9.0% by weight based on the total weight thereof.

The size of the dispersed silica particles determined by SEM (x 30,000) was about 60 nm. The dispersed silica particles showed no macroscopic phase separation and hence a good adhesivity to the resin.

The casted product was subjected to frictional wear test in the same manner as in Example 31 (JIS K 7218) to determine their tribological properties. When PV was 500 kg/cm$^2$•m/min, the sample exhibited a friction coefficient of 0.17. When PV was 1,500 kg/cm$^2$•m/min, the sample exhibited a friction coefficient of 0.09 and an abrasion wear of 0.60 mg/min. It can be thus seen that the sample of Examples 36 exhibits a lower friction coefficient and abrasion wear than those of the casted product comprising carbon fiber alone incorporated in a resin (friction coefficient and abrasion wear where PV is 500: 0.38 and 0.67 mg/min, respectively) and hence excellent sliding properties.

EXAMPLE 37

To a solution obtained by mixing 100 parts by weight of a phenolic resin (Plyophen J-325, available from Dainippon Ink & Chemicals, Inc.; resol phenolic resin soluble in methanol; solid content: 60%;-pH 8.2; Mw: 1,700) with 12 parts by weight of asbestos with thorough stirring was added dropwise a homogeneous solution comprising 22 parts by weight of tetramethylorthosilicate (available from Tokyo Kasei Kogyo K.K.), 50 parts by weight of methanol and 10 parts by weight of water with stirring to prepare a homogeneous liquid mixture.

The liquid mixture was allowed to stand with stirring at a temperature of 30° C. in an airtight vessel for 10 minutes, slowly solvent-casted in a polystyrene vessel for 3 days, and then heated at a rate of 2° C. per minute to a temperature of 60° C. where it was then allowed to stand for 2 hours, and then to a temperature of 80° C. where it was then allowed to stand for 8 hours. The casted material was withdrawn from the polystyrene vessel, and then ground to particles having a particle diameter of about 1 mm. The particles were packed into a mold (2 mm thick spacer), and then press-molded under the same conditions as used in Example 34.

The molded asbestos-filled product thus obtained exhibited a silica content (silica/(silica+resin)) of 11.8% by weight and an asbestos content of 10.1% by weight based on the total weight thereof. The molded asbestos-filled product was subjected to frictional wear test in the same manner as in Example 31 (JIS K 7218) to determine its tribological properties. When PV was 1,500 kg/cm$^2$•m/min, the sample exhibited a friction coefficient of 0.28, which is an increase from that of Example 31 (friction coefficient where PV is 1,500 kg/cm$^2$•m/min: 0.06), and a critical PV value of not less than 12,000 kg/cm$^2$m/min. It can be thus seen that the sample of Example 37 exhibits excellent friction properties as compared with the sample of Example 31 (critical PV value: 5,000 kg/cm$^2$•m/min).

EXAMPLE 38

A composite of a phenolic resin with silica was prepared in the same manner as in Example 32 except that to 100 parts by weight of a phenolic resin (Plyophen J-325, available from Dainippon Ink & Chemicals, Inc.; resol phenolic resin soluble in methanol; solid content: 60%; pH 8.2; Mw: 1,700) was added dropwise a homogeneous solution comprising 5.5 parts by weight of tetramethylorthosilicate (available from Tokyo Kasei Kogyo K.K.), 50 parts by weight of methanol and 2.5 parts by weight of water with stirring to prepare a homogeneous liquid mixture.

The composite thus obtained was a 2 mm thick homogeneous transparent (light transmittance: 97%) product having a silica content (silica/(silica+resin)) of 3.5% by weight. The size of the dispersed silica particles determined by scanning electron microscope (SEM) (x 30,000) was about 50 nm. The dispersed silica particles showed no peeling at the interface with the matrix resin and hence a good adhesivity to the matrix resin.

The casted product was subjected to frictional wear test in the same manner as in Example 32. When the product PV of the interface contact pressure (P (kg/cm$^2$)) and the speed (V (m/min)) was 500 kg/cm$^2$•m/min, the sample of Example 38 exhibited a friction coefficient of 0.14. When PV was 1,000 kg/cm$^2$•m/min, the sample of Example 38 exhibited a friction coefficient of 0.09. It can be thus seen that the casted product of Example 38 exhibits a lower friction coefficient than that of the resin alone (friction coefficient where PV is 500 kg/cm$^2$•m/min: 0.59; friction coefficient when PV is 1,000 kg/cm$^2$•m/min: 0.31) and hence excellent sliding properties even when the silica content is as small as 3.5% by weight.

EXAMPLE 39

The same composite of a phenolic resin with silica as prepared in Example 31 was subjected to frictional wear test in the same manner as in Example 31. The temperature of the sliding surface developed during the test where PV was 1,000, 2,000 and 3,000 kg/cm$^2$•m/min were 43° C., 45° C. and 51° C., respectively. It can be thus seen that the sample exhibits a lower value than that of the resin alone (53° C., 73° C. and 96° C. where PV is 1,000, 2,000 and 3,000 kg/cm$^2$•m/min, respectively) and generates less frictional heat at the sliding surface.

EXAMPLE 40

A composite of a phenolic resin with silica was prepared in the same manner as in Example 31 except that the final heat treatment temperature was 200° C. where the material was then allowed to stand for 45 minutes. The composite of a phenolic resin with silica thus obtained was then subjected to frictional wear test in the same manner as in Example 31 except that the temperature at which measurement is effected was altered. In some detail, when the product PV of the interface contact pressure (P (kg/cm$^2$)) and the speed (V (m/min)) was 500 kg/cm$^2$•m/min, the ambient temperature at which the frictional wear test is effected was changed from room temperature (25° C.) to 200° C. Under these conditions, the friction coefficient was 0.14 (25° C.), 0.12 (50° C.), 0.10 (100° C.), 0.09 (150° C.) and 0.10 (200° C.). It can be thus seen that the sample of Example 40 exhibits a lower and stabler friction coefficient than that of the resin alone (0.21 (25° C.), 0.19 (50° C.), 0.20 (100° C.), 0.19 (150° C.), 0.13 (200° C.)) over this temperature range.

COMPARATIVE EXAMPLE 13

100 parts by weight of a phenolic resin (Plyophen J-325, available from Dainippon Ink & Chemicals, Inc.; resol phenolic resin soluble in methanol; solid content: 60%; pH 8.2; Mw: 1,700) were mixed with 45 parts by weight of methanol to prepare a homogeneous liquid mixture.

The liquid mixture was allowed to stand with stirring at a temperature of 30° C. in an airtight vessel for 5 minutes, slowly solvent-casted in a polystyrene vessel for 3 days, and then heated at a rate of 2° C. per minute to a temperature of 80° C. where it was then allowed to stand for 8 hours. The casted material was withdrawn from the polystyrene vessel, and then heated at a rate of 2° C. per minute to 150° C. where it was then allowed to stand for 45 minutes to obtain a casted phenolic resin product.

The casted product thus obtained was a 2 mm thick homogeneous transparent (light transmittance: 99%) product. The casted product was subjected to frictional wear test in the same manner as in Example 29 (JIS K 7218; carbon steel used: S-45C; rotational speed V of carbon steel: 50 m/min) to determine its tribological properties. When PV was 500 kg/cm$^2$•m/min, the sample exhibited a friction coefficient of 0.59. When PV is 1,000 kg/cm$^2$•m/min, the sample exhibited a friction coefficient of 0.31 and an abrasion wear of 1.73 mg/min.

COMPARATIVE EXAMPLE 14

100 parts by weight of a phenolic resin (Plyophen J-325, available from Dainippon Ink & Chemicals, Inc.; resol phenolic resin soluble in methanol; solid content: 60%; pH 8.2; Mw: 1,700) were homogeneously mixed with 50 parts by weight of methanol and 10 parts by weight of carbon fiber (SG-241).

The homogeneous solution thus obtained was allowed to stand with stirring at a temperature of 30° C. in an airtight vessel for 10 minutes, slowly solvent-casted in a polystyrene vessel for 3 days, and then heated at a rate of 2° C. per minute to a temperature of 80° C. where it was then allowed to stand for 10 hours. The casted material was withdrawn from the polystyrene vessel, and then heated at a rate of 2° C. per minute to 150° C. where it was then allowed to stand for 45 minutes to obtain a casted phenolic resin/carbon fiber product.

The casted product thus obtained was a 2 mm thick homogeneous black opaque (light transmittance: 0%) product. The casted product was subjected to frictional wear test in the same manner as in Example 29 (JIS K 7218; carbon steel used: S-45C; rotational speed V of carbon steel: 50 m/min) to determine its tribological properties. When PV was 500 kg/cm$^2$•m/min, the sample exhibited a friction coefficient of 0.38 and an abrasion wear of 0.67 mg/min.

As mentioned above, the present invention can provide a thermosetting resin with an enhancement in surface properties such as hardness, and in tribological properties such as friction coefficient, critical PV value and wearability and in mechanical properties such as impact resistance, particularly strength, elastic modulus and elongation. Thus, the present invention can provide a cured or uncured composite of a thermosetting resin with a metallic oxide which can be used as a molding material, sliding material, friction material, coating material, film-forming material, etc., a process for the preparation thereof, and a tribological material comprising such a composite.

While the invention has been described in detail and with reference to specific embodiments thereof, it will be apparent to one skilled in the art that various changes and modifications can be made therein without departing from the spirit and scope thereof.

What is claimed is:

1. A process for the preparation of a composite of a thermosetting resin with a metallic oxide, which comprises subjecting a metal alkoxide containing a silicon alkoxide and/or a low condensate thereof to hydrolysis and polycondensation in a solution of a phenolic resin and/or thermosetting resin containing a phenolic resin while effecting the removal of the solvent and/or curing reaction of the resins to incorporate a particulate metallic oxide homogeneously in said composite without causing macroscopic phase separation.

2. The process for the preparation of a composite of a thermosetting resin with a metallic oxide according to claim 1, which comprises the steps of:

(1) preparing a resin solution comprising a phenolic resin and/or thermosetting resin containing a phenolic resin dissolved in a solvent miscible with both said metal alkoxide and water;

(2) adding a metal alkoxide containing a silicon alkoxide and/or a low condensate thereof, a solvent miscible with both said metal alkoxide and water, and optionally water and/or catalyst to said resin solution to form a homogeneous solution without causing phase separation of the mixed solution; and (3) simultaneously effecting the hydrolysis and polycondensation of said metal alkoxide and the removal of the solvent and curing reaction of the resins prior to the gelation of the mixed solution to obtain a homogeneous composite of a thermosetting resin with a metallic oxide without causing macroscopic phase separation.

3. A process for the preparation of a composite of a thermosetting resin with a metallic oxide, which comprises preparing a solution comprising a metal alkoxide and water and/or catalyst, allowing said solution to undergo reaction for a period of time of not more than 90% of the gelation time thereof, preparing a homogeneous solution of the reaction product and a solution of a phenolic resin and/or thermosetting resin containing a phenolic resin, and then subjecting said metal alkoxide-to further hydrolysis and polycondensation in said homogeneous solution while effecting the removal of the solvents and/or curing reaction of the resins to incorporate a particulate metallic oxide homogeneously in said thermosetting resin without causing macroscopic phase separation.

4. The process for the preparation of a composite of a thermosetting resin with a metallic oxide according to claim 3, which comprises the steps of:

(1) preparing a resin solution comprising a phenolic resin and/or thermosetting resin containing a phenolic resin dissolved in a solvent miscible with both said metal alkoxide and water;

(2) preparing a solution comprising a metal alkoxide containing a silicon alkoxide and/or a low condensate thereof, a solvent miscible with both said metal alkoxide and water, and water, and optionally a catalyst, and allowing said solution to undergo reaction for a period of time of not more than 90% of the gelation time thereof to prepare a metal alkoxide solution;

(3) mixing said resin solution, said metal alkoxide solution, optionally a solvent miscible with both said two solutions, and optionally water and/or catalyst to form a homogeneous solution without causing phase separation thereof; and (4) simultaneously effecting the hydrolysis and polycondensation of said metal alkoxide and the removal of the solvent and curing reaction of the resins prior to the gelation of the mixed solution to obtain a homogeneous composite of a thermosetting resin with a metallic oxide without causing macroscopic phase separation.

5. The process for the preparation of a composite of a thermosetting resin with a metallic oxide according to any one of claims 1 to 4, wherein the size of the particulate metallic oxide incorporated in said composite of a thermosetting resin with a metallic oxide is from 0.01 to 5 $\mu$m as calculated in terms of average particle diameter.

6. The process for the preparation of a composite of a thermosetting resin with a metallic oxide according to any one of claims 1 to 4, wherein the content of metallic oxide in said composite of a thermosetting resin with a metallic oxide is from 1 to 35% by weight.

7. The process for the preparation of a composite of a thermosetting resin with a metallic oxide according to any one of claims 1 to 4, wherein the amount of water to be used is from 0.5 to 12 mol per mol of the metal alkoxide used and the amount of solvent to be used is high enough to be miscible said metal alkoxide and water therein.

8. The process for the preparation of a composite of a thermosetting resin with a metallic oxide according to any one of claims 1 to 4, wherein the hydrolysis and polycondensation of said metal alkoxide is effected with water content in the air with which said metal alkoxide is brought into contact during solvent casting without incorporating water in said solution containing a thermosetting resin and a metal alkoxide.

9. The process for the preparation of a composite of a thermosetting resin with a metallic oxide according to any one of claims 1 to 4, wherein said catalyst is an organic acid or inorganic acid and its amount is from 0 to 0.3 mol per mol of the metal alkoxide used.

10. The process for the preparation of a composite of a thermosetting resin with a metallic oxide according to any one of claims 1 to 4, wherein said phenolic resin and/or thermosetting resin containing a phenolic resin is soluble in a solvent compatible with said metal alkoxide.

11. The process for the preparation of a composite of a thermosetting resin with a metallic oxide according to claim 10, wherein said phenolic resin and/or thermosetting resin containing a phenolic resin is soluble in an alcohol obtained by the hydrolysis of said metal alkoxide.

12. The process for the preparation of a composite of a thermosetting resin with a metallic oxide according to any one of claims 1 to 4, wherein said phenolic resin is a resol phenolic resin.

13. The process for the preparation of a composite of a thermosetting resin with a metallic oxide according to any one of claims 1 to 4, wherein said phenolic resin is a high ortho phenolic resin.

14. The process for the preparation of a composite of a thermosetting resin with a metallic oxide according to any one of claims 1 to 4, wherein said metal alkoxide is a silicon alkoxide or a low condensate thereof.

15. The process for the preparation of a composite of a thermosetting resin with a metallic oxide according to any one of claims 1 to 4, wherein said metal alkoxide comprises a monoalkyltrialkoxysilane or dialkyldialkoxysilane in an amount of from 1 to 40 parts by weight based on 100 parts by weight of tetraalkoxysilane and/or low condensate thereof.

16. A process for the preparation of an uncured composite of a thermosetting resin with a metallic oxide, which comprises subjecting a metal alkoxide containing a silicon alkoxide and/or a low condensate thereof to hydrolysis and polycondensation in a solution of a phenolic resin and/or thermosetting resin containing a phenolic resin while removing the solvents until the apparent solvent content represented by the following equation (1) reaches 1 to 20% by weight:

$$\text{Apparent solvent content (wt.\%)} = \{(\text{weight of composite including solvent}) - (\text{weight of composite from which solvent has been completely removed})\} / (\text{weight of composite from which solvent has been completely removed}) \times 100 \quad (1).$$

17. A process for the preparation of an uncured composite of a thermosetting resin with a metallic oxide, which comprises subjecting a metal alkoxide containing a silicon alkoxide and/or a low condensate thereof to hydrolysis and polycondensation in a solution of a novolak phenolic resin capable of melt-molding without any organic solvent and soluble in an organic solvent while drying the polycondensation product at a temperature of not higher than the melt temperature of said novolak phenolic resin so that the organic solvent used is removed therefrom.

18. The process for the preparation of an uncured composite of a thermosetting resin with a metallic oxide according to claim 17, wherein said novolak phenolic resin or solution thereof has previously comprised a curing agent incorporated therein.

19. A process for the preparation of an uncured composite of a thermosetting resin with a metallic oxide, which comprises subjecting a metal alkoxide containing a silicon alkoxide and/or a low condensate thereof to hydrolysis and polycondensation in a solution of a phenolic resin and/or thermosetting resin containing a phenolic resin while removing the solvents until the apparent solvent content represented by the following equation (1) reaches 1 to 20% by weight to prepare an uncured composite of a thermosetting resin with a metallic oxide containing a solvent, and then thermoforming said uncured composite at a higher temperature or higher temperature and pressure than those used for the removal of the solvents:

$$\text{Apparent solvent content (wt. \%)} = \{(\text{weight of composite including solvent}) - (\text{weight of composite from which solvent has been completely removed})\} / (\text{weight of composite from which solvent has been completely removed}) \times 100 \quad (1).$$

* * * * *